(12) United States Patent
Murayama et al.

(10) Patent No.: US 12,325,503 B2
(45) Date of Patent: Jun. 10, 2025

(54) MARINE VESSEL MANEUVERING SUPPORT SYSTEM, AND MARINE VESSEL

(71) Applicant: YAMAHA HATSUDOKI KABUSHIKI KAISHA, Iwata (JP)

(72) Inventors: Takuya Murayama, Shizuoka (JP); Masaru Tamaki, Shizuoka (JP)

(73) Assignee: TAMAHA HATSUDOKI KABUSHIKI KAISHA, Shizuoka (JP)

( * ) Notice: Subject to any disclaimer, the term of this patent is extended or adjusted under 35 U.S.C. 154(b) by 373 days.

(21) Appl. No.: 17/976,977

(22) Filed: Oct. 31, 2022

(65) Prior Publication Data
US 2023/0150640 A1    May 18, 2023

(30) Foreign Application Priority Data
Nov. 17, 2021    (JP) ................. 2021-187172

(51) Int. Cl.
| B63H 25/02 | (2006.01) |
| B63H 25/42 | (2006.01) |
| B63H 25/46 | (2006.01) |
| G05D 1/00 | (2006.01) |

(52) U.S. Cl.
CPC ............. *B63H 25/02* (2013.01); *B63H 25/42* (2013.01); *B63H 25/46* (2013.01); *G05D 1/0206* (2013.01); *B63H 2025/022* (2013.01)

(58) Field of Classification Search
CPC ........ B63H 25/02; B63H 25/42; B63H 25/46; B63H 2025/022; G05D 1/0206
See application file for complete search history.

(56) References Cited

U.S. PATENT DOCUMENTS

| 7,278,367 | B1* | 10/2007 | Gonring | B63H 21/213 |
| | | | | 200/61.57 |
| 10,048,690 | B1* | 8/2018 | Hilbert | B63H 25/42 |
| 2005/0199168 | A1* | 9/2005 | Mizutani | B63H 25/24 |
| | | | | 114/144 R |
| 2005/0282447 | A1 | 12/2005 | Okuyama | |

(Continued)

FOREIGN PATENT DOCUMENTS

| JP | 62-8900 A | 1/1987 |
| JP | 08-20388 A | 1/1996 |

(Continued)

*Primary Examiner* — Justin S Lee
(74) *Attorney, Agent, or Firm* — Keating & Bennett, LLP

(57) ABSTRACT

A marine vessel maneuvering support system includes a steering apparatus including a wheel portion supported rotatably with respect to a hull, mode switches provided on the wheel portion and operable to execute lateral thrust generation modes to generate a thrust that moves the hull in a lateral direction, paddles provided on the steering apparatus and operable to cause a thrust to be applied to the hull in a front-rear direction, and a controller configured or programmed to control at least two propulsion devices and execute the lateral thrust generation modes in accordance with instructions from the mode switches. The controller is configured or programmed to control at least one propulsion device of the at least two propulsion devices to generate or change the thrust in the front-rear direction acting on the hull in response to operations of the paddles when the lateral thrust generation mode is being executed.

15 Claims, 11 Drawing Sheets

(56) References Cited

U.S. PATENT DOCUMENTS

| | | | | |
|---|---|---|---|---|
| 2006/0054067 A1* | 3/2006 | Hoberman | ............. | B63H 25/44 |
| | | | | 114/145 R |
| 2010/0145558 A1 | 6/2010 | Kaji | | |
| 2015/0166159 A1 | 6/2015 | Inoue et al. | | |
| 2016/0304181 A1* | 10/2016 | Steven | ................... | B63H 25/02 |
| 2017/0305520 A1* | 10/2017 | Watanabe | ............. | B63H 25/42 |
| 2018/0111671 A1* | 4/2018 | Shibayama | .......... | G05D 1/0206 |
| 2018/0251203 A1* | 9/2018 | Shibayama | ............ | B63H 25/02 |
| 2018/0273152 A1 | 9/2018 | Koyano et al. | | |
| 2020/0247519 A1* | 8/2020 | Fujino | ................... | B63H 25/02 |
| 2021/0053665 A1* | 2/2021 | Fujino | .................... | B63B 79/40 |
| 2021/0139123 A1* | 5/2021 | Osara | .................... | B63H 21/14 |
| 2021/0354803 A1* | 11/2021 | Christensen | ........... | B63H 25/42 |

FOREIGN PATENT DOCUMENTS

| | | |
|---|---|---|
| JP | 2005-200004 A | 7/2005 |
| JP | 2006-001432 A | 1/2006 |
| JP | 5371401 B2 | 12/2013 |
| JP | 2015-116847 A | 6/2015 |
| JP | 2018-158628 A | 10/2018 |

\* cited by examiner

MARINE VESSEL MANEUVERING SUPPORT SYSTEM, AND MARINE VESSEL

CROSS REFERENCE TO RELATED APPLICATIONS

This application claims the benefit of priority to Japanese Patent Application No. 2021-187172, filed on Nov. 17, 2021. The entire contents of this application are hereby incorporated herein by reference.

BACKGROUND OF THE INVENTION

1. Field of the Invention

The present invention relates to a marine vessel maneuvering support system, and a marine vessel.

2. Description of the Related Art

Conventionally, in order to bring a hull of a marine vessel alongside a pier or the like, there has been known a marine vessel maneuvering support system that uses two or more propulsion devices to generate a thrust which moves the hull in parallel in a lateral direction. For example, in a marine vessel disclosed in Japanese Laid-Open Patent Publication (kokai) No. 2018-158628, when one of a left lateral movement switch and a right lateral movement switch which are provided on a steering apparatus is operated, the marine vessel's maneuvering mode becomes a lateral movement mode, and the marine vessel's hull moves laterally. In addition, when the left lateral movement switch or the right lateral movement switch is operated during the lateral movement mode, the marine vessel's maneuvering mode becomes a pressing mode, and a pressed state in which the hull is pressed against the pier is maintained. However, in the marine vessel disclosed in Japanese Laid-Open Patent Publication (kokai) No. 2018-158628, it is not possible to move the hull diagonally while moving the hull laterally.

On the other hand, Japanese Patent No. 5371401 discloses a marine vessel maneuvering support system in which a right lateral movement button and a left lateral movement button are provided on a throttle operation portion and a hull of a marine vessel is laterally moved by operating the right lateral movement button or the left lateral movement button. In the marine vessel maneuvering support system disclosed in Japanese Patent No. 5371401, by switching the position of a shift lever to forward or backward while moving the hull laterally, it is possible to move the hull diagonally.

However, in the marine vessel maneuvering support system disclosed in Japanese Patent No. 5371401, it is necessary to perform an operation which moves the hull laterally near the throttle operation portion. In addition, in the case of being desired to move the hull diagonally while moving the hull laterally, it is necessary to change the position of the shift lever. Therefore, there is room for improvement from the viewpoint of improving the operability when carrying out the diagonal movement of the hull.

SUMMARY OF THE INVENTION

Preferred embodiments of the present invention provide marine vessel maneuvering support systems and marine vessels that are each able to enhance the operability when bringing a hull of a marine vessel alongside a pier or the like.

According to a preferred embodiment of the present invention, a marine vessel maneuvering support system includes a steering apparatus including a wheel portion supported rotatably with respect to a hull, mode switches provided on the wheel portion and operable to execute lateral thrust generation modes to generate a thrust that moves the hull in a lateral direction, paddles provided on the steering apparatus and operable to cause a thrust to be applied to the hull in a front-rear direction, and a controller configured or programmed to control at least two propulsion devices and execute the lateral thrust generation modes in accordance with instructions from the mode switches. The controller is configured or programmed to control at least one propulsion device of the at least two propulsion devices to generate or change the thrust in the front-rear direction acting on the hull in response to operations of the paddles when the lateral thrust generation mode is being executed.

According to another preferred embodiment of the present invention, a marine vessel maneuvering support system includes a steering apparatus including a wheel portion supported rotatably with respect to a hull, mode switches operable to execute lateral thrust generation modes to generate a thrust that moves the hull in a lateral direction, paddles operable to cause a thrust to be applied to the hull in a front-rear direction, and a controller configured or programmed to control at least two propulsion devices and execute the lateral thrust generation modes in accordance with instructions from the mode switches. The controller is configured or programmed to control at least one propulsion device of the at least two propulsion devices to generate or change the thrust in the front-rear direction acting on the hull in response to operations of the paddles when the lateral thrust generation mode is being executed.

According to another preferred embodiment of the present invention, a marine vessel includes the marine vessel maneuvering support system described above.

According to a preferred embodiment of the present invention, the controller controls the at least two propulsion devices and executes the lateral thrust generation modes in accordance with the instructions from the mode switches. In addition, the controller controls the at least one propulsion device of the at least two propulsion devices to generate or change the thrust in the front-rear direction acting on the hull in response to the operations of the paddles when the lateral thrust generation mode is being executed.

For example, with the operations of the paddles, when bringing the hull of the marine vessel alongside a pier or the like, it is possible to move the hull diagonally while moving the hull laterally, and it is also possible to adjust the longitudinal position of the hull while the hull is being pressed against the pier or the like. As a result, it is possible to enhance the operability when bringing the hull of the marine vessel alongside a pier or the like.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
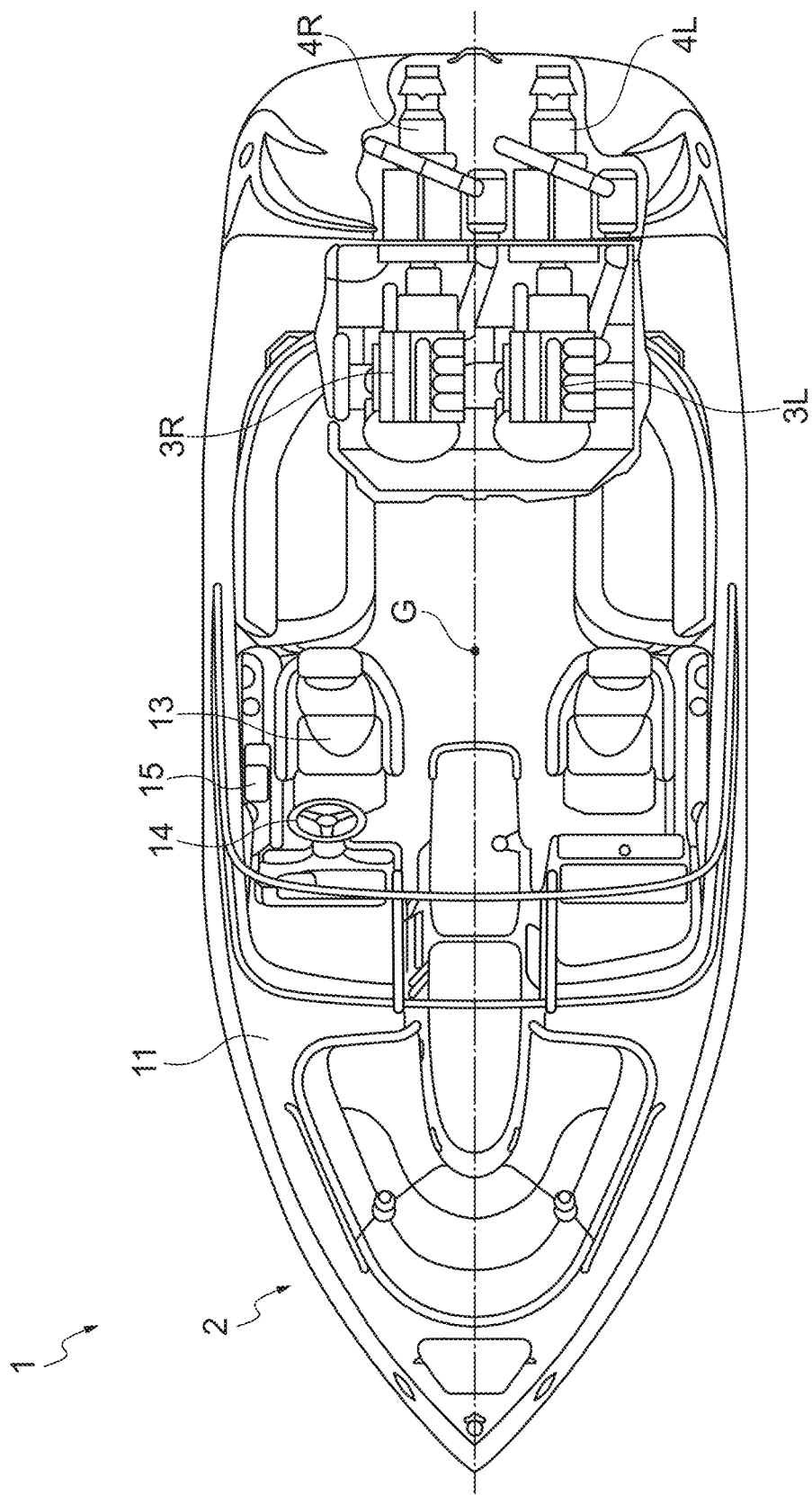
FIG. 1 is a plan view of a marine vessel according to a preferred embodiment of the present invention.
Figure 2:
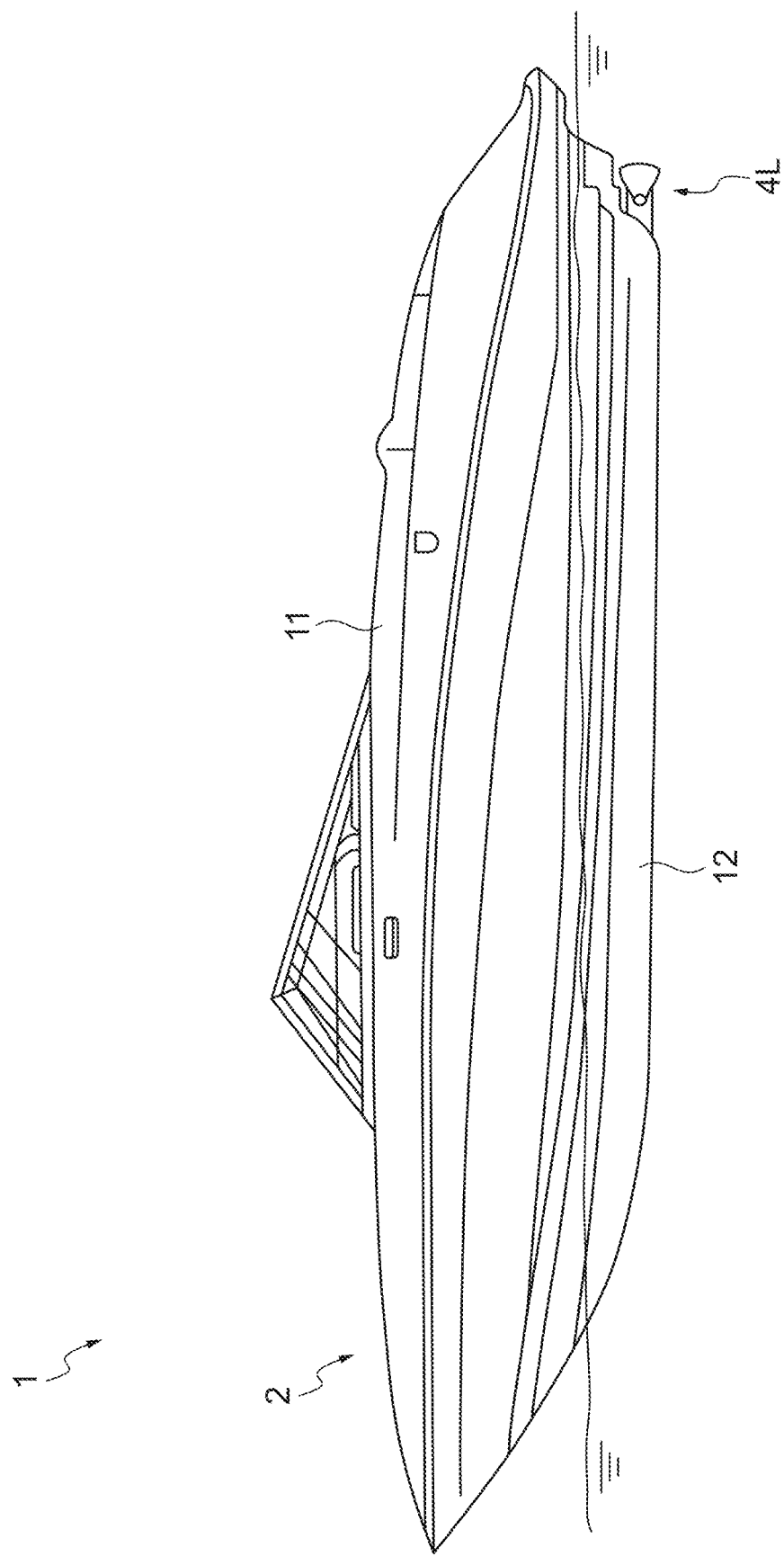
FIG. 2 is a side view of the marine vessel according to a preferred embodiment of the present invention.

FIG. 1 is a plan view of a marine vessel according to a preferred embodiment of the present invention. A steering apparatus for a marine vessel and a marine vessel maneuvering support system according to a preferred embodiment of the present invention are applied to a marine vessel 1. FIG. 1 shows a portion of an internal configuration of the marine vessel 1. FIG. 2 is a side view of the marine vessel 1. The marine vessel 1 is, for example, a jet propulsion boat, and is such a marine vessel called a jet boat or a sports boat.

The marine vessel 1 includes a hull 2, engines 3L and 3R, and marine vessel propulsion devices 4L and 4R. The hull 2 includes a deck 11 and a hull 12. The hull 12 is located below the deck 11. A maneuvering seat 13 is located on the deck 11. In addition, a steering apparatus 14 functioning as the steering apparatus for the marine vessel, and a remote control unit 15 are located near the maneuvering seat 13.

The marine vessel 1 includes the engine 3L (hereinafter, also referred to as "a first engine 3L") and the engine 3R (hereinafter, also referred to as "a second engine 3R"). In addition, the marine vessel 1 includes the marine vessel propulsion device 4L (hereinafter, also referred to as "a first marine vessel propulsion device 4L") and the marine vessel propulsion device 4R (hereinafter, also referred to as "a second marine vessel propulsion device 4R"). However, the number of the engines is not limited to two, and may be three or more. Further, the number of the marine vessel propulsion devices is not limited to two, and may be three or more.

The first engine 3L and the second engine 3R are housed in the hull 2. An output shaft of the first engine 3L is connected to the first marine vessel propulsion device 4L. An output shaft of the second engine 3R is connected to the second marine vessel propulsion device 4R. The first marine vessel propulsion device 4L is driven by the first engine 3L, and generates a propulsive force (a thrust) that moves the hull 2. The second marine vessel propulsion device 4R is driven by the second engine 3R, and generates the propulsive force (the thrust) that moves the hull 2. The first marine vessel propulsion device 4L and the second marine vessel propulsion device 4R are located side by side laterally.

Figure 3:
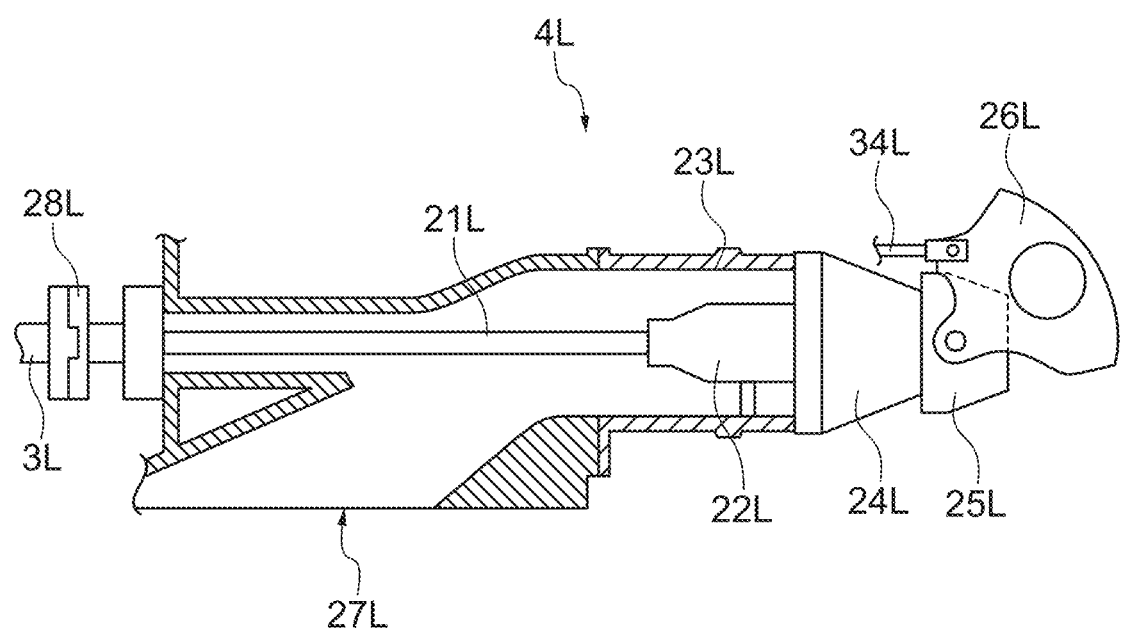
FIG. 3 is a schematic side view that shows a configuration of a first marine vessel propulsion device.

FIG. 3 is a schematic side view that shows a configuration of the first marine vessel propulsion device 4L. In FIG. 3, a portion of the first marine vessel propulsion device 4L is shown in a cross section. The first marine vessel propulsion device 4L is a jet propulsion device that sucks in water around the hull 2 and jets it out.

As shown in FIG. 3, the first marine vessel propulsion device 4L includes a first impeller shaft 21L, a first impeller 22L, a first impeller housing 23L, a first nozzle 24L, a first deflector 25L, and a first reverse bucket 26L. The first impeller shaft 21L extends in a front-rear direction. A front portion of the first impeller shaft 21L is connected to the output shaft of the first engine 3L via a coupling 28L. A rear portion of the first impeller shaft 21L is located inside the first impeller housing 23L. The first impeller housing 23L is located behind a water suction portion 27L. The first nozzle 24L is located behind the first impeller housing 23L.

The first impeller 22L is attached to the rear portion of the first impeller shaft 21L. The first impeller 22L is located inside the first impeller housing 23L. The first impeller 22L rotates together with the first impeller shaft 21L and sucks the water from the water suction portion 27L. The first impeller 22L jets the sucked water rearward from the first nozzle 24L.

The first deflector 25L is located behind the first nozzle 24L. The first reverse bucket 26L is located behind the first deflector 25L. The first deflector 25L is configured so as to change a jetting direction of the water from the first nozzle 24L to a left/right direction. That is, by changing the direction of the first deflector 25L to the left/right direction, a traveling direction (a moving direction) of the marine vessel 1 is changed to the left or the right.

A first steering actuator 32L is connected to the first deflector 25L of the first marine vessel propulsion device 4L. The first reverse bucket 26L is switchable between a forward position, a reverse position, and a neutral position. When the first reverse bucket 26L is in the forward position, the water from the first nozzle 24L is jetted rearward. As a result, the marine vessel 1 moves forward. When the first reverse bucket 26L is in the reverse position, the jetting direction of the water from the first nozzle 24L is changed to ahead (the water from the first nozzle 24L is jetted forward). As a result, the marine vessel 1 moves backward.

Here, the neutral position of the first reverse bucket 26L is a position between the forward position and the reverse position. In the neutral position, the first reverse bucket 26L changes the direction of a jet flow of the water from the first nozzle 24L to the left or the right of the hull 2. Therefore, in the neutral position, the first reverse bucket 26L reduces a propulsive force (a thrust) that moves the hull 2 forward. As a result, either the hull 2 is slowed down or the hull 2 is held at a stopping position. Although illustration is omitted, the second marine vessel propulsion device 4R is configured similarly to the first marine vessel propulsion device 4L.

Figure 4:
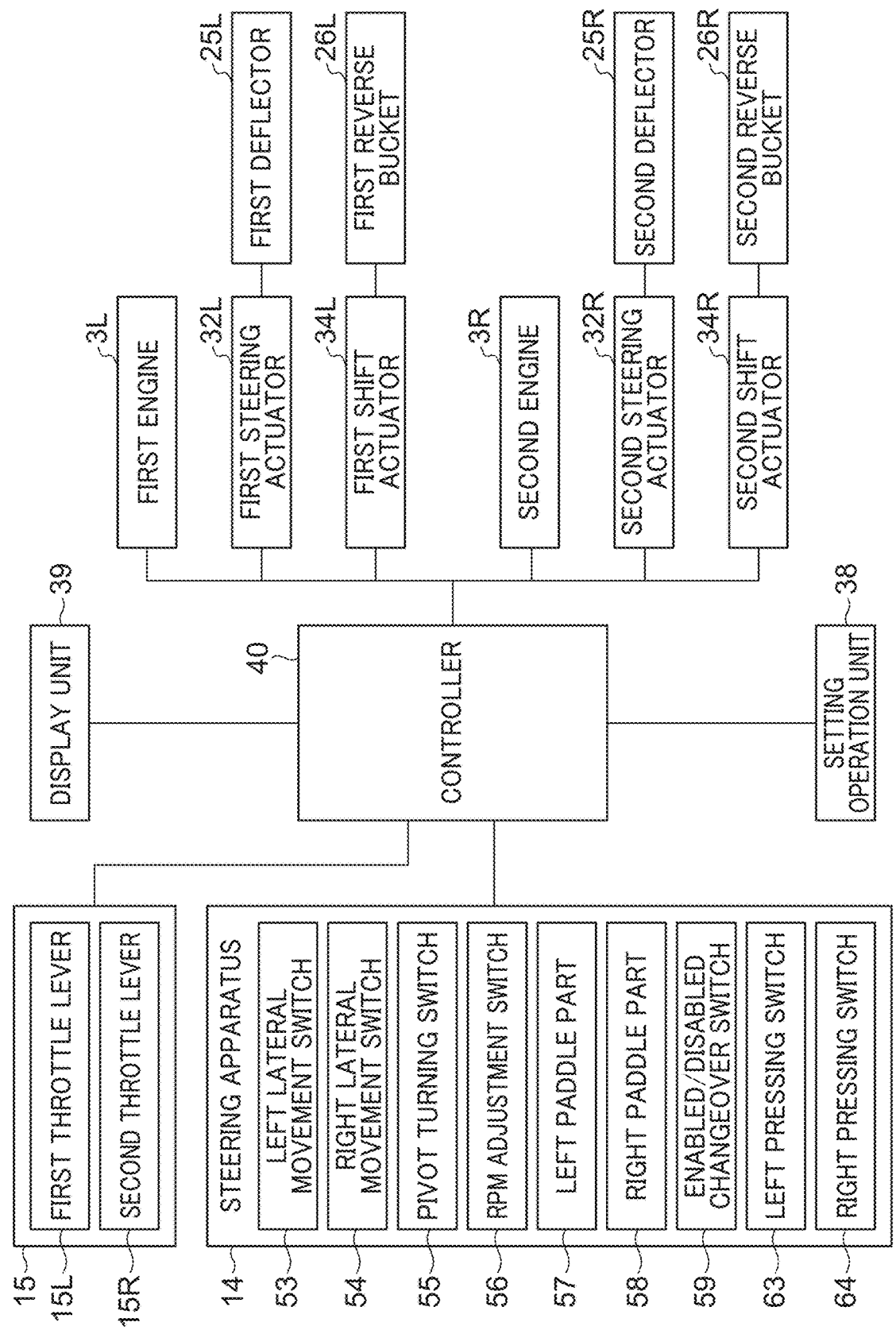
FIG. 4 is a block diagram of a control system of the marine vessel including a marine vessel maneuvering support system.

Next, a control system of the marine vessel 1 will be described. FIG. 4 is a block diagram of the control system of the marine vessel 1 including the marine vessel maneuvering support system in a preferred embodiment of the present invention.

The marine vessel maneuvering support system includes a controller 40 (a controller) and the steering apparatus 14. The controller 40 includes a processor (not shown) such as a CPU (Central Processing Unit) and storage devices (not shown) such as a RAM (Random Access Memory) and a ROM (Read Only Memory), and is programmed so as to control the marine vessel 1.

The marine vessel 1 includes the first steering actuator 32L and a first shift actuator 34L. The controller 40 is communicably connected to the first engine 3L, the first steering actuator 32L, and the first shift actuator 34L.

The first steering actuator 32L changes a steering angle of the first deflector 25L. The first steering actuator 32L is, for example, an electric motor. Alternatively, the first steering actuator 32L may be another actuator such as a hydraulic cylinder.

The first shift actuator 34L is connected to the first reverse bucket 26L of the first marine vessel propulsion device 4L. The first shift actuator 34L switches the position of the first reverse bucket 26L between the forward position, the reverse position, and the neutral position. The first shift actuator 34L is, for example, an electric motor. Alternatively, the first shift actuator 34L may be another actuator such as a hydraulic cylinder.

The marine vessel 1 includes a second steering actuator 32R and a second shift actuator 34R. The second steering actuator 32R is connected to a second deflector 25R of the second marine vessel propulsion device 4R. The second shift actuator 34R is connected to a second reverse bucket 26R of the second marine vessel propulsion device 4R. These configurations are devices to control the second marine vessel propulsion device 4R, and are the same configurations as the configuration of the first steering actuator 32L and the configuration of the first shift actuator 34L that are described above. The controller 40 is communicably connected to the second steering actuator 32R and the second shift actuator 34R.

The controller 40 may be a single apparatus, or may be a plurality of separate control units. The controller 40 is communicably connected to the steering apparatus 14 and the remote control unit 15.

The remote control unit 15 is operated to adjust outputs of the engines 3L and 3R and switch between forward moving and backward moving. The remote control unit 15 includes a first throttle lever 15L and a second throttle lever 15R. The first throttle lever 15L and the second throttle lever 15R are operable in a forward moving direction and in a backward moving direction from zero operation positions, respectively.

The remote control unit 15 outputs signals that indicate operation amounts and operation directions of the first throttle lever 15L and the second throttle lever 15R. In a normal marine vessel maneuvering mode (described below), the controller 40 controls a rotational speed of the first engine 3L according to the operation amount of the first throttle lever 15L. The controller 40 controls a rotational speed of the second engine 3R according to the operation amount of the second throttle lever 15R. The controller 40 controls the first shift actuator 34L according to the operation direction of the first throttle lever 15L. The controller 40 controls the second shift actuator 34R according to the operation direction of the second throttle lever 15R. As a result, switching between the forward moving and the backward moving of the marine vessel 1 is performed.

The marine vessel 1 includes a display unit 39 and a setting operation unit 38. The display unit 39 includes a display and displays various kinds of information based on instructions from the controller 40. The setting operation unit 38 includes an operation piece (not shown) to perform operations related to marine vessel maneuvering, a setting operation piece (not shown) to perform various kinds of settings, and an inputting operation piece (not shown) to input various kinds of instructions. Signals inputted by the setting operation unit 38 are supplied to the controller 40.

The steering apparatus 14 includes a left lateral movement switch 53, a right lateral movement switch 54, a pivot turning switch 55, an RPM (revolutions per minute) adjustment switch 56, a left paddle 57, a right paddle 58, an enabled/disabled changeover switch 59, a left pressing switch 63, and a right pressing switch 64. The switches 53, 54, 55, 56, 59, 63, and 64, and the paddles 57 and 58 are operated by a marine vessel operator, and operation signals are supplied to the controller 40. Functions and arrangements of the switches 53, 54, 55, 56, 59, 63, and 64, and the paddles 57 and 58 will be described below.

Here, various kinds of marine vessel maneuvering modes will be described. The marine vessel maneuvering modes are roughly divided into "the normal marine vessel maneuvering mode" and "drive modes". The drive modes include "lateral thrust generation modes" and "a pivot turning mode". The lateral thrust generation modes include "lateral movement modes" (first modes) and "pressing modes" (second modes). Specifically, the lateral movement modes include a left lateral movement mode and a right lateral movement mode, and the pressing modes include a left pressing mode and a right pressing mode.

In the normal marine vessel maneuvering mode, the controller 40 controls a bow direction of the hull 2 according to the operation of a wheel portion 43. The steering apparatus 14 outputs an operation signal, which indicates an operation position of the wheel portion 43, to the controller 40. The controller 40 controls the steering actuators 32L and 32R according to the operation of the wheel portion 43. As a result, the bow direction of the hull 2 is changed to the left or the right. In addition, in the normal marine vessel maneuvering mode, the controller 40 controls the marine vessel propulsion devices 4L and 4R according to the operation of the remote control unit 15.

In the drive modes, the controller 40 controls the marine vessel propulsion devices 4L and 4R according to the operations of the switches and the paddles of the steering apparatus 14. That is, the functions of the switches 53, 54, 55, 56, 59, 63, and 64, and the paddles 57 and 58 of the steering apparatus 14 are enabled in the drive modes.

The enabled/disabled changeover switch 59 switches the marine vessel maneuvering mode between the normal marine vessel maneuvering mode and the drive mode, and the marine vessel maneuvering mode is switched each time the enabled/disabled changeover switch 59 is pressed.

The lateral thrust generation modes (the lateral movement modes and the pressing modes) are modes, which generate a thrust that moves the hull 2 in a lateral direction. Among the lateral movement modes, the left lateral movement mode and the right lateral movement mode are modes that control the marine vessel propulsion devices 4L and 4R so as to laterally move the hull 2 leftward and rightward, respectively. Further, among the pressing modes, the left pressing mode and the right pressing mode are modes that control the marine vessel propulsion devices 4L and 4R so that the hull 2 comes alongside a docking place such as a pier and a state in which the hull 2 is pressed against the docking place is maintained. The lateral movement modes and the pressing modes are common in that the thrust to move the hull 2 in the lateral direction acts on the hull 2. However, the lateral thrust (the thrust in the lateral direction) acting on the hull 2 is smaller in the pressing modes than in the lateral movement modes.

Here, lateral moving means that the hull 2 moves in a horizontal direction without rotating in a yaw direction around the center of gravity G (see FIG. 1). For example, in the lateral movement modes without pivot turning, the center of gravity G of the hull 2 moves leftward or rightward. Further, in the lateral thrust generation modes (the lateral movement modes and the pressing modes), it is also possible to move the hull 2 in an oblique direction (diagonally left, right, front and rear) without pivot turning by applying a thrust in the front-rear direction (described below with reference to FIGS. 9A to 9E, and 10). Furthermore, the pivot turning mode is a mode in which the hull 2 is rotated around the center of gravity G in the yaw direction.

Figure 5:
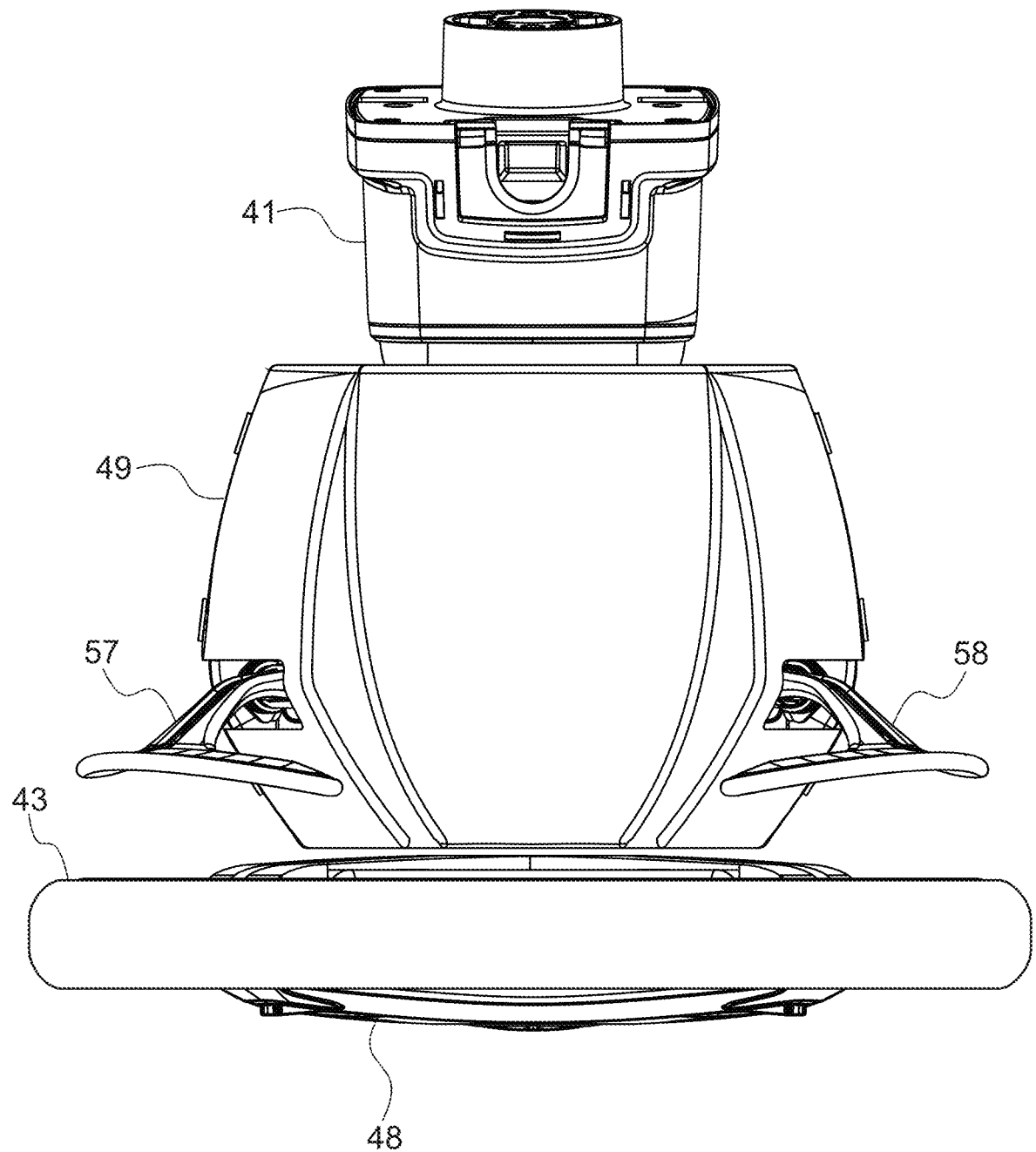
FIG. 5 is a view of a steering apparatus when viewed from above.
Figure 6:
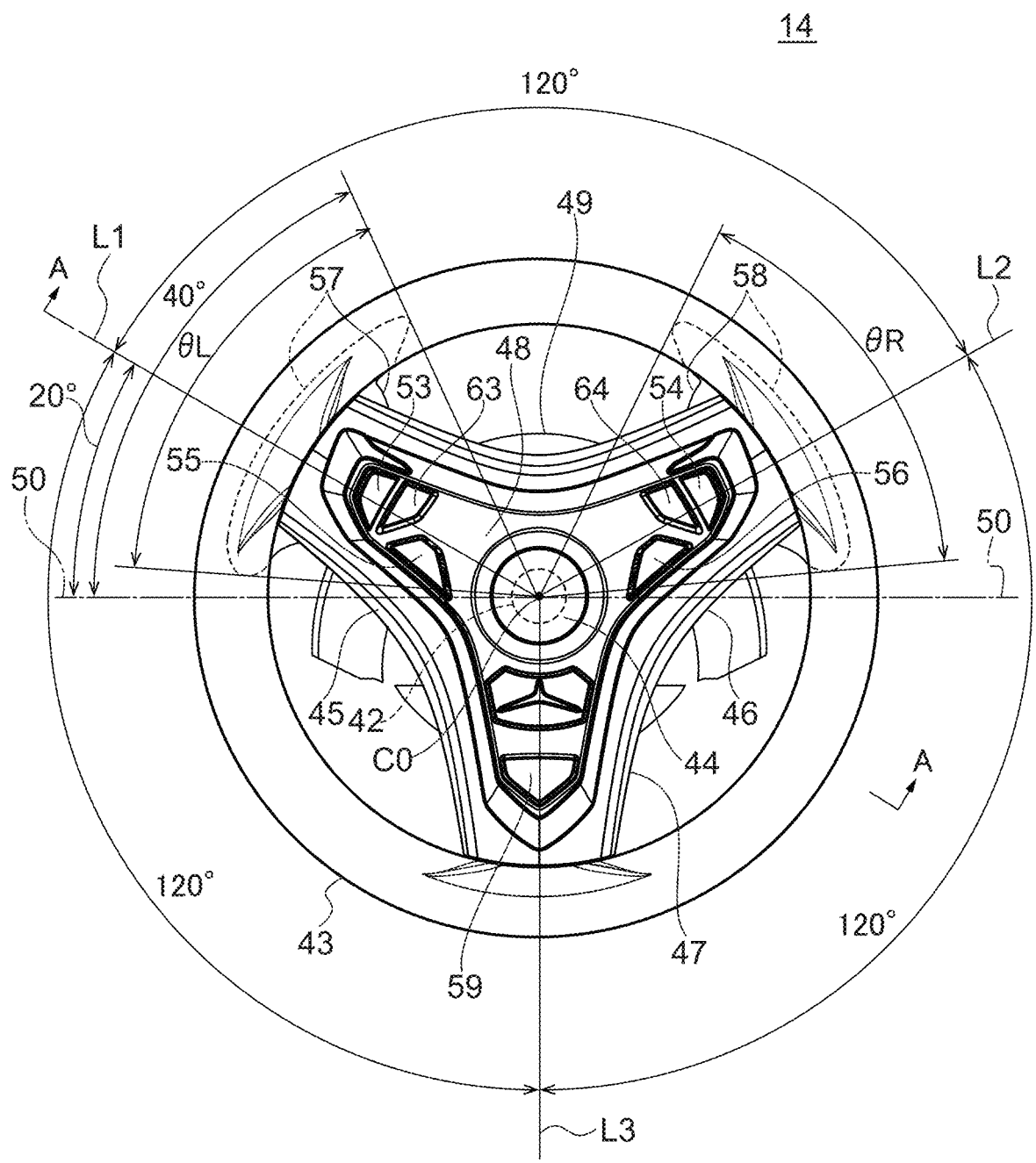
FIG. 6 is a view of the steering apparatus when viewed from the front.

FIG. 5 is a view of the steering apparatus 14 when viewed from above. FIG. 6 is a view of the steering apparatus 14 when viewed from the front.

The steering apparatus 14 includes a steering mast 41, and a paddle cover 49 provided with the left paddle 57 and the right paddle 58 (see FIG. 5). In addition, as shown in FIG. 6, the steering apparatus 14 includes a central portion 44, the wheel portion 43 having an annular shape, and three spoke portions (a first spoke portion 45, a second spoke portion 46, and a third spoke portion 47). The spoke portions 45, 46, and 47 connect the central portion 44 and the wheel portion 43 to form a steering wheel that rotates together (rotates integrally). In addition, the steering wheel including the left paddle 57, the right paddle 58, and the paddle cover 49 may also be referred to as a steering wheel. The wheel portion 43 is a portion that is gripped by the marine vessel operator.

The central portion 44 is supported rotatably around a rotation fulcrum C0, which is a shaft line (an axis) of a steering shaft 42, with respect to the hull 2. In FIG. 6, the steering apparatus 14 is viewed from the front in a shaft line direction of the rotation fulcrum C0.

Hereinafter, positional relationships and angular relationships in a circumferential direction about the rotation fulcrum C0 will be specified by a state where the steering wheel is in the neutral position shown in FIG. 6. The neutral position referred to here is the rotational position of the wheel portion 43 when the hull 2 is caused to move straight. Virtual straight lines passing through the center positions of the spoke portions 45, 46, and 47 in the width direction and the rotation fulcrum C0 when viewed from the shaft line direction of the rotation fulcrum C0 are set as virtual straight lines L1, L2, and L3, respectively. The virtual straight line L1 extends diagonally to the upper left from the rotation fulcrum C0, and the virtual straight line L2 extends diagonally to the upper right from the rotation fulcrum C0. Therefore, the first spoke portion 45 is a left spoke portion that extends to the upper left from the central portion 44, and the second spoke portion 46 is a right spoke portion that extends to the upper right from the central portion 44.

In the circumferential direction about the rotation fulcrum C0, the virtual straight line L1, the virtual straight line L2, and the virtual straight line L3 define an angle of about 120° with each other. That is, the spoke portions 45, 46, and 47 are located at angular intervals of about 120°.

A surface 48 of the spoke portions 45, 46, and 47 and the central portion 44 is a continuous reference surface. The switches 53, 54, 55, 56, 59, 63, and 64 are located on the surface 48. The switches 53, 54, 55, 56, 59, 63, and 64 are all push button type switches that are movable in a direction perpendicular to the surface 48.

The left lateral movement switch 53, the left pressing switch 63, and the pivot turning switch 55 are located on the first spoke portion 45 in this order from the outward side in a radial direction centered on the rotation fulcrum C0. The left lateral movement switch 53 and the left pressing switch 63 are adjacent to each other. The left lateral movement switch 53 and the left pressing switch 63 are positioned on the common virtual straight line L1.

The right lateral movement switch 54, the right pressing switch 64, and the RPM adjustment switch 56 are located on the second spoke portion 46 in this order from the outward side in the radial direction centered on the rotation fulcrum C0. The right lateral movement switch 54 and the right pressing switch 64 are adjacent to each other. The right lateral movement switch 54 and the right pressing switch 64 are positioned on the common virtual straight line L2.

In the radial direction centering on the rotation fulcrum C0, an outer edge position of the left lateral movement switch 53 is farther away than an outer edge position of the left pressing switch 63 with respect to the rotation fulcrum C0. Similarly, in the radial direction centered on the rotation fulcrum C0, an outer edge position of the right lateral movement switch 54 is farther away than an outer edge position of the right pressing switch 64 with respect to the rotation fulcrum C0.

A set of the switches 53 and 63 and a set of the switches 54 and 64 are provided as a left and right pair. When viewed from the shaft line direction of the rotation fulcrum C0, the set of the switches 53 and 63 and the set of the switches 54 and 64 are located at positions that are linearly symmetrical with respect to a straight line extending along the virtual straight line L3. Similarly, the pivot turning switch 55 and the RPM adjustment switch 56 are located at positions that are linearly symmetrical with respect to the straight line extending along the virtual straight line L3. The enabled/disabled changeover switch 59 (a third switch) is located on the third spoke portion 47.

The left paddle 57 and the right paddle 58 are provided so as to protrude from the paddle cover 49 (see FIG. 5). The left paddle 57 and the right paddle 58 are freely movable in the front-rear direction. The paddles 57 and 58 are rotated toward the front with respect to initial positions by being operated by the marine vessel operator, and return to the initial positions when hands operating the paddles 57 and 58 are released. The paddles 57 and 58 are operable at arbitrary positions between the initial positions and maximum operation positions. With respect to the steering mast 41, the paddle cover 49, the left paddle 57, and the right paddle 58 rotate integrally with the wheel portion 43 around the rotation fulcrum C0.

As shown in FIG. 6, when viewed from the shaft line direction of the rotation fulcrum C0, the left paddle 57 and the right paddle 58 are located at positions that are linearly symmetrical with respect to the straight line extending along the virtual straight line L3. The left lateral movement switch 53 is located at a position where the marine vessel operator is able to operate the left lateral movement switch 53 with a finger of a hand operating the left paddle 57. The right lateral movement switch 54 is located at a position where the marine vessel operator is able to operate the right lateral movement switch 54 with a finger of a hand operating the right paddle 58.

The left paddle 57 exists in an angle range $\theta L$ in the circumferential direction about the rotation fulcrum C0. The right paddle 58 exists in an angle range $\theta R$ in the circumferential direction about the rotation fulcrum C0. Therefore, in a state where the wheel portion 43 is in the neutral position, the switches 53 and 63 are positioned within the angle range $\theta L$ in the circumferential direction in which the left paddle 57 is located, and the switches 54 and 64 are positioned within the angle range $\theta R$ in the circumferential direction in which the right paddle 58 is located.

A virtual plane passing through the rotation fulcrum C0 and parallel to the left/right direction is set as a virtual plane 50 (see FIG. 6). In the state where the wheel portion 43 is in the neutral position, the switches 53 and 63 are positioned above the virtual plane 50, and in the circumferential direction about the rotation fulcrum C0, are positioned within an angle range from, for example, about 20° to about 40° with respect to the virtual plane 50. The same applies to the switches 54 and 64, and although angles are not shown, the switches 54 and 64 are positioned within the angle range from about 20° to about 40° with respect to the virtual plane 50. It should be noted that the angle range θL and the angle range θR are also included in the angle range from about 20° to about 40° with respect to the virtual plane 50.

Further, in the state where the wheel portion 43 is in the neutral position, in the shaft line direction of the rotation fulcrum C0, when the wheel portion 43 is viewed from the marine vessel operator, at least a portion of the first spoke portion 45 and at least a portion of the left paddle 57 overlap each other, and at least a portion of the second spoke portion 46 and at least a portion of the right paddle 58 overlap each other.

Figure 7:
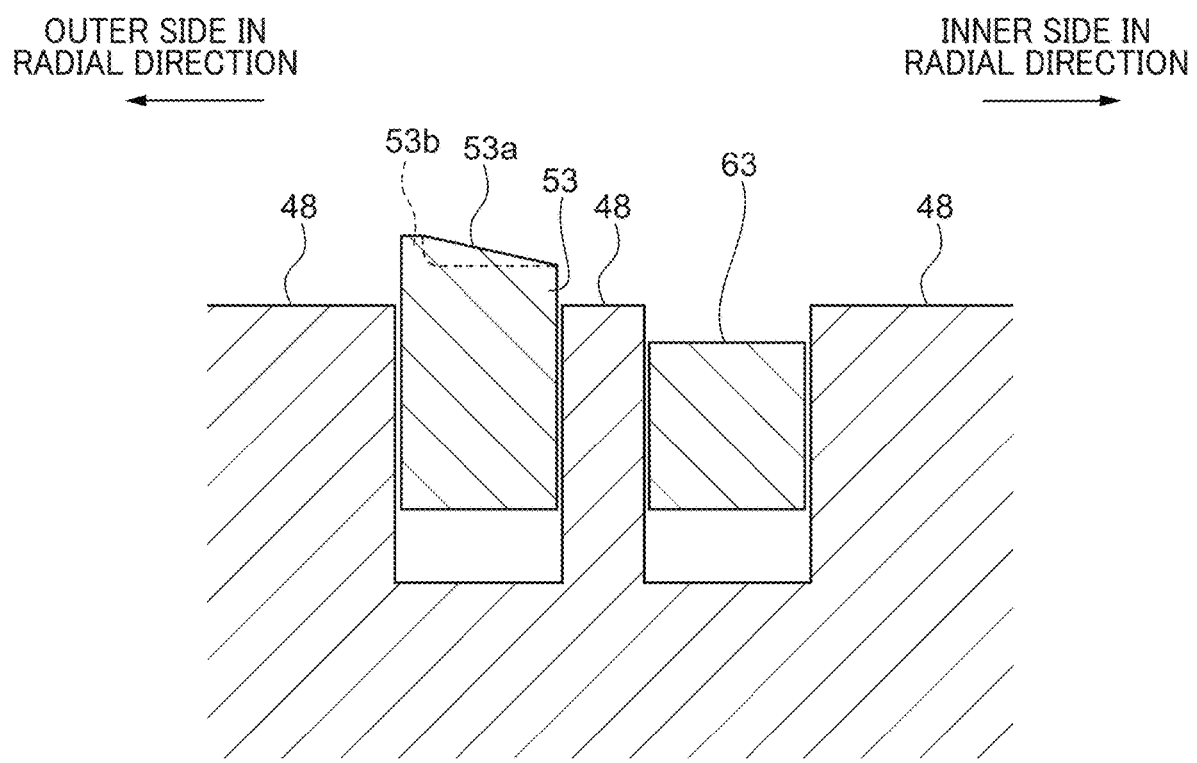
FIG. 7 is a schematic partial sectional view taken along line A-A of FIG. 6.

FIG. 7 is a schematic partial sectional view taken along line A-A of FIG. 6. It should be noted that the line A-A extends through the virtual straight line L1. The left lateral movement switch 53 and the left pressing switch 63 are different from each other in height in a pressing direction (in a position of an operated surface). That is, the left lateral movement switch 53 protrudes than the surface 48 (protrudes with respect to the surface 48), and the left pressing switch 63 is recessed from the surface 48 (is recessed with respect to the surface 48). A height relationship between the switches 54 and 64 is the same as a height relationship between the switches 53 and 63. Moreover, as with the left pressing switch 63, the enabled/disabled changeover switch 59, the pivot turning switch 55, and the RPM adjustment switch 56 may be recessed from the surface 48 (may be recessed with respect to the surface 48).

Further, an operated surface 53a of the left lateral movement switch 53 becomes higher toward the outer side in the radial direction centered on the rotation fulcrum C0. This makes it easier to recognize the operated surface 53a with a sense of touch even while performing the paddle operation. It should be noted that a height of the operated surface 53a may vary uniformly in the radial direction. However, from the viewpoint of facilitating recognition of the operated surface 53a, it is not essential that the height of the operated surface 53a varies uniformly in the radial direction, and a region whose height does not vary may exist in a portion of the operated surface 53a. Therefore, the height of the operated surface 53a may be higher at a second position (for example, a position farthest from the rotation fulcrum C0 in the radial direction), which is located on the outer side than a first position (for example, a position nearest to the rotation fulcrum C0 in the radial direction), than at the first position.

Further, as indicated by a dotted line in FIG. 7, the shape of the operated surface 53a may include a lip portion 53b at a position near the outer side in the radial direction. By providing the lip portion 53b, not only it is easier to recognize the operated surface 53a with the sense of touch, but it is also easier to operate with less finger slippage. It should be noted that an operated surface of the right lateral movement switch 54 may also be configured in the same manner as the operated surface 53a.

Next, the functions of the switches 53, 54, 55, 56, 59, 63, and 64, and the paddles 57 and 58 of the steering apparatus 14 will be described. In addition, a control performed by the controller 40 will be described.

Primarily in the normal marine vessel maneuvering mode, the controller 40 controls the bow direction of the hull 2 according to the operation of the wheel portion 43. The steering apparatus 14 outputs the operation signal, which indicates the operation position of the wheel portion 43, to the controller 40. The controller 40 controls the steering actuators 32L and 32R according to the operation of the wheel portion 43. As a result, the bow direction of the hull 2 is changed to the left or the right.

Primarily in the drive modes, the controller 40 controls the marine vessel propulsion devices 4L and 4R based on the operation signals of the switches 53, 54, 55, 56, 59, 63, and 64, and the paddles 57 and 58.

The left paddle 57 (a paddle for backward moving) is operable to issue an instruction to cause a backward thrust to be applied to the hull 2, and the right paddle 58 (a paddle for forward moving) is operable to issue an instruction to cause a forward thrust to be applied to the hull 2. Mainly in the drive modes, the controller 40 controls so as to apply a thrust corresponding to operation amounts of the paddles 57 and 58 to the hull 2. The paddles 57 and 58 are usually operated while the wheel portion 43 is gripped by the marine vessel operator.

The functions of the switches 53, 54, 55, 56, 63, and 64 that are located on the surface 48 are enabled in the drive modes. Therefore, the enabled/disabled changeover switch 59 switches enabling/disabling of the functions of the switches 53, 54, 55, 56, 63, and 64.

The left lateral movement switch 53, the right lateral movement switch 54, the left pressing switch 63, and the right pressing switch 64 are mode switches to select or activate the lateral thrust generation modes.

The left lateral movement switch 53 and the right lateral movement switch 54 are first switches to select or activate the lateral movement mode, and are switches to generate the thrust in the lateral direction with respect to the hull 2 while these switches are pressed by the marine vessel operator. The controller 40 controls the marine vessel propulsion devices 4L and 4R in accordance with instructions from the switches 53 and 54 to execute the lateral movement modes. The controller 40 maintains the lateral movement mode during the operation period of the switches 53 and 54.

The left pressing switch 63 and the right pressing switch 64 are second switches to select or activate the pressing mode, and are switches operable to generate the thrust in the lateral direction with respect to the hull 2 in response to being pressed. The controller 40 controls the marine vessel propulsion devices 4L and 4R in accordance with instructions from the switches 63 and 64 to execute the pressing modes. The controller 40 maintains the pressing mode during the period from when the switches 63 and 64 are operated until when the release operation is performed.

Therefore, the switches 53 and 54 and the switches 63 and 64 are also switches to control the hull 2 in different modes (the lateral movement mode and the pressing mode). In other words, the switches 53, 54, 63, and 64 are common in that all of them are switches to cause a thrust to be applied to the hull 2 in the lateral direction. However, these switches are mainly used when bringing the hull alongside, and a frequency of use of the switches 53 and 54 is higher than a frequency of use of the switches 63 and 64. In addition, since not only the switches 53 and 54 (the first switches) have a function (a first function) that cause a thrust to be applied to the hull 2 in the lateral direction, but also the switches 63 and 64 (the second switches) have the function (the first function) that cause a thrust to be applied to the hull 2 in the lateral direction, the switches 53 and 54 (the first switches) and the switches 63 and 64 (the second switches) have functions (the first functions) that overlap each other. On the other hand, the switches 53 and 54 (the first switches) are the switches to continue generating the thrust in the lateral direction with respect to the hull 2 while they are pressed by the marine vessel operator, and the switches 63 and 64 (the second switches) are the switches to generate the thrust in the lateral direction with respect to the hull 2 in response to being pressed. From this point of view, the switches 53 and 54 (the first switches) and the switches 63 and 64 (the second switches) have second functions that are different from each other.

The pivot turning switch 55 instructs to start the pivot turning mode. In the pivot turning mode, the controller 40 controls the marine vessel propulsion devices 4L and 4R to rotate the hull 2 leftward or rightward on the spot according to the rotation operation of the wheel portion 43.

The RPM adjustment switch 56 switches engine speeds of the engines 3L and 3R between at least two stages (for example, low and high). Switching of the engine speeds of the engines 3L and 3R is applied to each mode of the drive modes. The stages of the engine speeds of the engines 3L and 3R that are switchable are set in advance for each mode.

Figure 8:
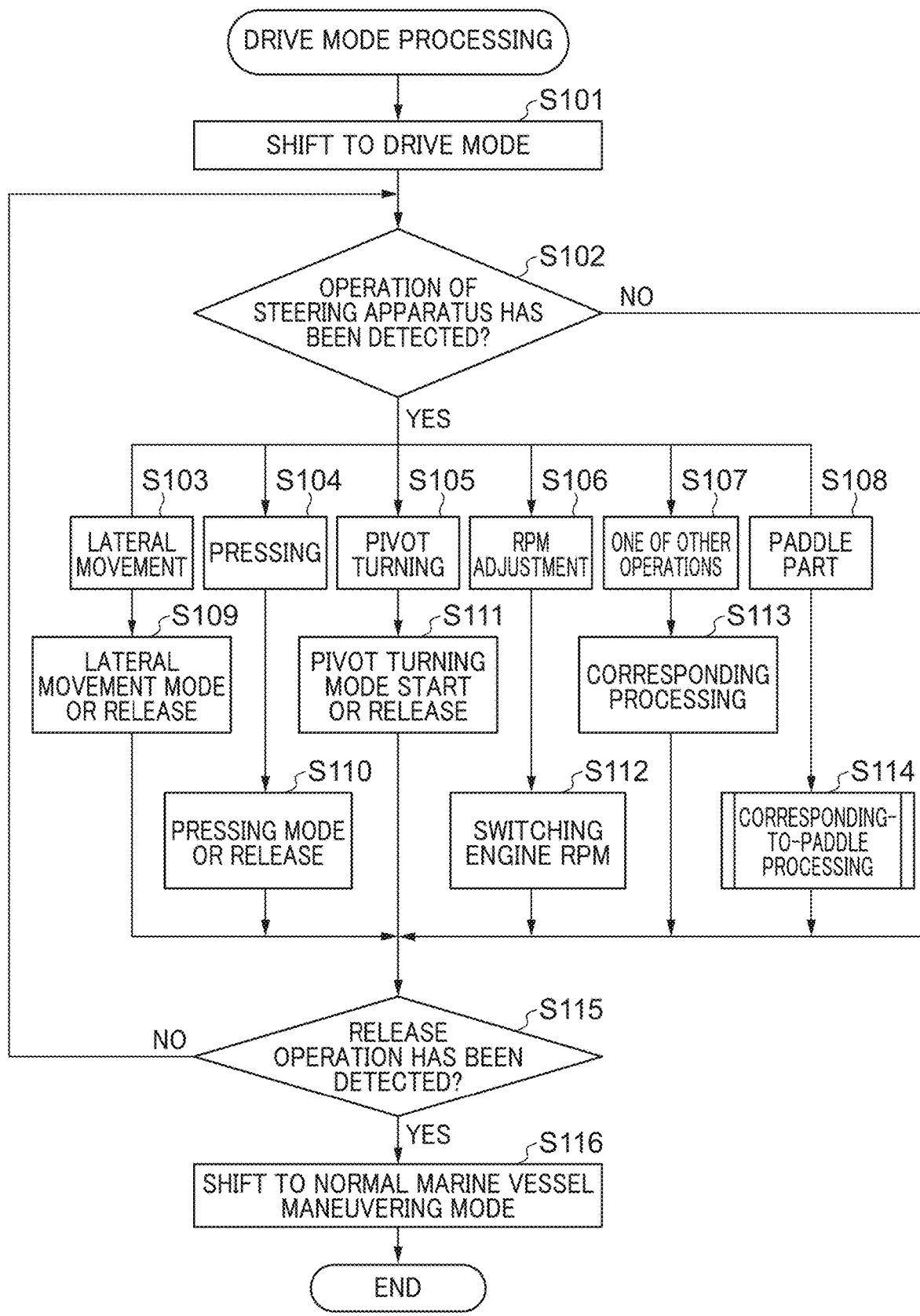
FIG. 8 is a flowchart that shows a drive mode process.

FIG. 8 is a flowchart that shows a drive mode process. In the controller 40, the drive mode process is achieved by the CPU expanding a program, which is stored in the ROM, to the RAM and executing the program. The drive mode process is started in response to a pressing operation of the enabled/disabled changeover switch 59 in the normal marine vessel maneuvering mode.

It should be noted that in the drive mode process, the left lateral movement mode, the right lateral movement mode, the left pressing mode, the right pressing mode, and the pivot turning mode are exclusively executed. Therefore, when one mode of these modes is shifted to another mode of these modes, the mode being executed is released.

In step S101, the controller 40 shifts the marine vessel maneuvering mode to the drive mode. In step S102, the controller 40 determines whether or not the operation of the steering apparatus 14 (the operation of any one of the switches 53, 54, 55, 56, 59, 63, and 64, the paddles 57 and 58, and the wheel portion 43) has been detected. The operations of the steering device 14 referred to here include pressing operations and releasing operations of the switches 53, 54, 55, 56, 59, 63, and 64, changing the depths of pressing of the paddles 57 and 58, and the rotation operation of the wheel portion 43.

Then, in the case that the operation of the steering apparatus 14 has not been detected (NO in step S102), the controller 40 proceeds to step S115, and determines whether or not the release operation of the drive mode has been detected. Here, the release operation of the drive mode corresponds to a new pressing operation of the enabled/disabled changeover switch 59 during the drive mode. In addition to this, it may be determined that the release operation has been detected when a switch, to which the release operation of the drive mode is assigned, is operated.

In the case that the release operation of the drive mode has not been detected (NO in step S115), the controller 40 returns to step S102, and on the other hand, in the case that the release operation of the drive mode has been detected (YES in step S115), the controller 40 proceeds to step S116. In step S116, the controller 40 shifts the marine vessel maneuvering mode to the normal marine vessel maneuvering mode, and ends the drive mode process shown in FIG. 8.

In the case that the operation of the steering apparatus 14 has been detected (YES in step S102), the controller 40 shifts to a process corresponding to an operation mode, and the switches, the paddles, etc. that have been operated.

First, in the case that the detected operation is an operation of the left lateral movement switch 53 or the right lateral movement switch 54 (step S103), the controller 40 executes step S109, and then proceeds to step S115.

In step S109, in the case of not being in the lateral movement mode, the controller 40 shifts to the left lateral movement mode when the left lateral movement switch 53 is newly press-operated, and shifts to the right lateral movement mode when the right lateral movement switch 54 is newly press-operated. Here, "newly press-operated (i.e., a new pressing operation has been performed)" means that shifting from a non-operating state to a pressing state has been performed (the same applies hereinafter). On the other hand, during the lateral movement mode, when the left lateral movement switch 53 or the right lateral movement switch 54 is release-operated, the controller 40 releases the lateral movement mode. Here, "release-operated (i.e., a releasing operation has been performed)" means that shifting from an operating state to a non-pressing state has been performed (the same applies hereinafter).

It should be noted that during the left lateral movement mode, when the right lateral movement switch 54 is newly press-operated, the lateral movement mode may be released or the lateral movement mode may be shifted to the right lateral movement mode. It should be noted that during the right lateral movement mode, when the left lateral movement switch 53 is newly press-operated, the lateral movement mode may be released or the lateral movement mode may be shifted to the left lateral movement mode.

In the case of having shifted to the left lateral movement mode or the right lateral movement mode in step S109, the controller 40 controls the marine vessel propulsion devices 4L and 4R to apply a thrust, which moves the hull 2 laterally to the left or the right, to the hull 2. Therefore, in the case of not being in contact with the pier, the hull 2 laterally moves to the left or the right. This will be described with reference to FIGS. 9A to 9E.

FIGS. 9A to 9E are schematic views that show a thrust acting on the hull 2 in the lateral movement mode or the pressing mode. For the sake of convenience, it is assumed that a rotation center position when the hull 2 pivot-turns coincides with the center of gravity G. Further, it is assumed that the first marine vessel propulsion device 4L and the second marine vessel propulsion device 4R are located at left and right symmetrical positions with respect to a center line of the hull 2 in the front-rear direction.

Figure 9D:
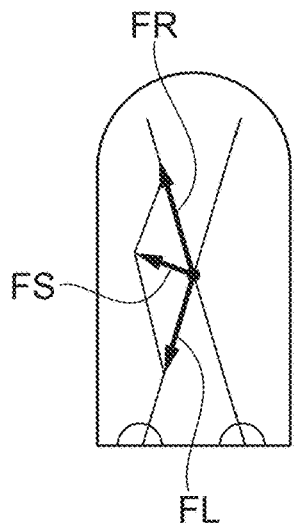
FIGS. 9A to 9E are schematic views that show a thrust acting on a hull in a lateral movement mode or a pressing mode.
Figure 9B:
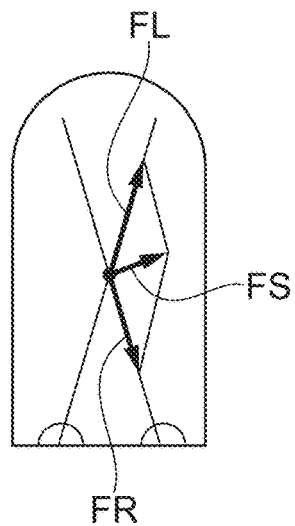
Figure 9A:
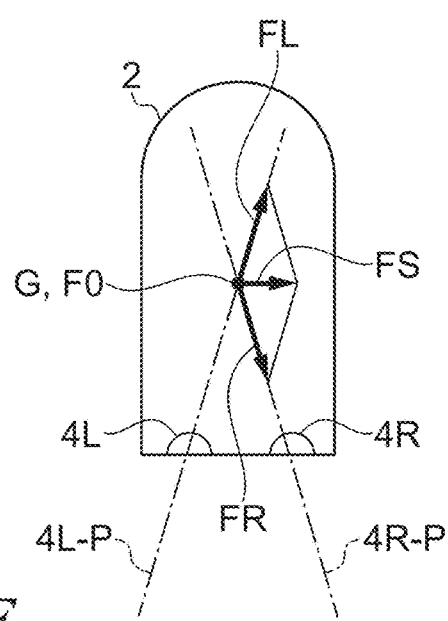

FIG. 9A shows the thrust acting on the hull 2 in the right lateral movement mode or the right pressing mode. As shown in FIG. 9A, in the right lateral movement mode or the right pressing mode, a first thrust acting line 4L-P of the first marine vessel propulsion device 4L and a second thrust acting line 4R-P of the second marine vessel propulsion device 4R intersect at the center of gravity G. In this case, a first thrust FL of the first marine vessel propulsion device 4L is a vector facing to front right, and a second thrust FR of the second marine vessel propulsion device 4R is a vector facing to rear right. A resultant force of the first thrust FL and the second thrust FR becomes a resultant force FS. The resultant force FS becomes a vector facing to the right. Therefore, the resultant force FS, which faces to the right, acts as a thrust on the hull 2 with the center of gravity G as an acting point FO. Therefore, since no rotational moment acts on the hull 2, the hull 2 laterally moves to the right without pivot-turning.

Figure 9E:
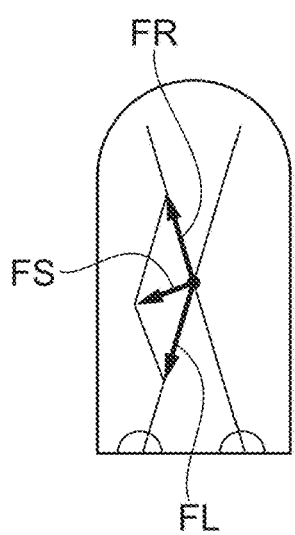
Figure 9C:
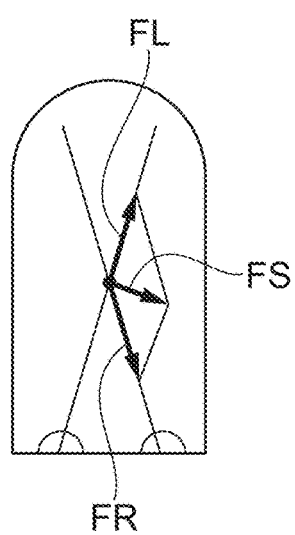

In addition, in the case of the left lateral movement mode or the left pressing mode, it can be understood that the left direction and the right direction are reversed with respect to the example shown in FIG. 9A. It should be noted that in the pressing mode, the direction of the resultant force FS remains the same as that in the lateral movement mode, and the magnitude of the resultant force FS is controlled to be smaller than in the lateral movement mode. It should be noted that the resultant force FS may be the same in the lateral movement mode and the pressing mode. FIGS. 9B to 9D will be described below in conjunction with the description of FIG. 10.

In the case that the detected operation is an operation of the left pressing switch 63 or the right pressing switch 64 as a result of the determination in step S102 (step S104), the controller 40 executes step S110, and then proceeds to step S115.

In step S110, in the case of not being in the pressing mode, the controller 40 shifts to the left pressing mode when the left pressing switch 63 is press-operated, and shifts to the right pressing mode when the right pressing switch 64 is press-operated. In addition, when the left pressing switch 63 is press-operated during the right pressing mode, the controller 40 shifts to the left pressing mode. Further, when the right pressing switch 64 is press-operated during the left pressing mode, the controller 40 shifts to the right pressing mode. On the other hand, when the left pressing switch 63 is press-operated during the left pressing mode, the controller 40 releases the left pressing mode. Further, when the right pressing switch 64 is press-operated during the right pressing mode, the controller 40 releases the right pressing mode.

In the case of having shifted to the left pressing mode or the right pressing mode in step S110, the controller 40 controls the marine vessel propulsion devices 4L and 4R to apply a thrust, which moves the hull 2 laterally to the left or the right (the resultant force FS smaller than that in the lateral movement mode), to the hull 2. At this time, if the hull 2 is in contact with the pier or the like, or is sufficiently close to the pier or the like, the state in which the hull 2 is pressed against the pier or the like is maintained.

In the case that the detected operation is an operation of the pivot turning switch 55 as the result of the determination in step S102 (step S105), the controller 40 executes step S111, and then proceeds to step S115.

In step S111, in the case of not being in the pivot turning mode, the controller 40 shifts to the pivot turning mode when the pivot turning switch 55 is newly press-operated. On the other hand, during the pivot turning mode, when the pivot turning switch 55 is newly press-operated, the controller 40 releases the pivot turning mode.

In the case that the detected operation is an operation of the RPM adjustment switch 56 as the result of the determination in step S102 (step S106), the controller 40 executes step S112, and then proceeds to step S115.

In step S112, when the RPM adjustment switch 56 is newly press-operated, the controller 40 switches the engine speeds of the engines 3L and 3R in stages according to the stage corresponding to the current mode. In the case of the mode in which the number of the stages is two, the engine speeds are alternately switched between a first value and a second value each time the RPM adjustment switch 56 is operated. In the case of the mode in which the number of the stages is three or more, the set engine speeds may be cycled or reciprocated each time the RPM adjustment switch 56 is operated.

In the case that the detected operation is one of other operations as the result of the determination in step S102 (step S107), the controller 40 executes other processes (processes corresponding to one of the other operations) in step S113, and then proceeds to step S115.

In step S113, for example, during the pivot turning mode, when the rotation operation of the wheel portion 43 as one of the other operations has been performed, the controller 40 controls so as to make the hull 2 pivot-turn at a speed corresponding to a rotation amount of the wheel portion 43. In order to make the hull 2 pivot-turn, an extension line of the vector of the resultant force FS should not pass through the center of gravity G by changing an angle of either or both angles of the first thrust acting line 4L-P and the second thrust acting line 4R-P. As a result, the acting point FO does not coincide with the center of gravity G. In addition, if the operation (not shown) of the switch is performed, in step S113, a process corresponding to the operation (not shown) of the switch may also be executed.

In the case that the detected operation is an operation of the left paddle 57 or the right paddle 58 as the result of the determination in step S102 (step S108), the controller 40 executes a corresponding-to-paddle process (see FIG. 10) that will be described below in step S114, and then proceeds to step S115.

Figure 10:
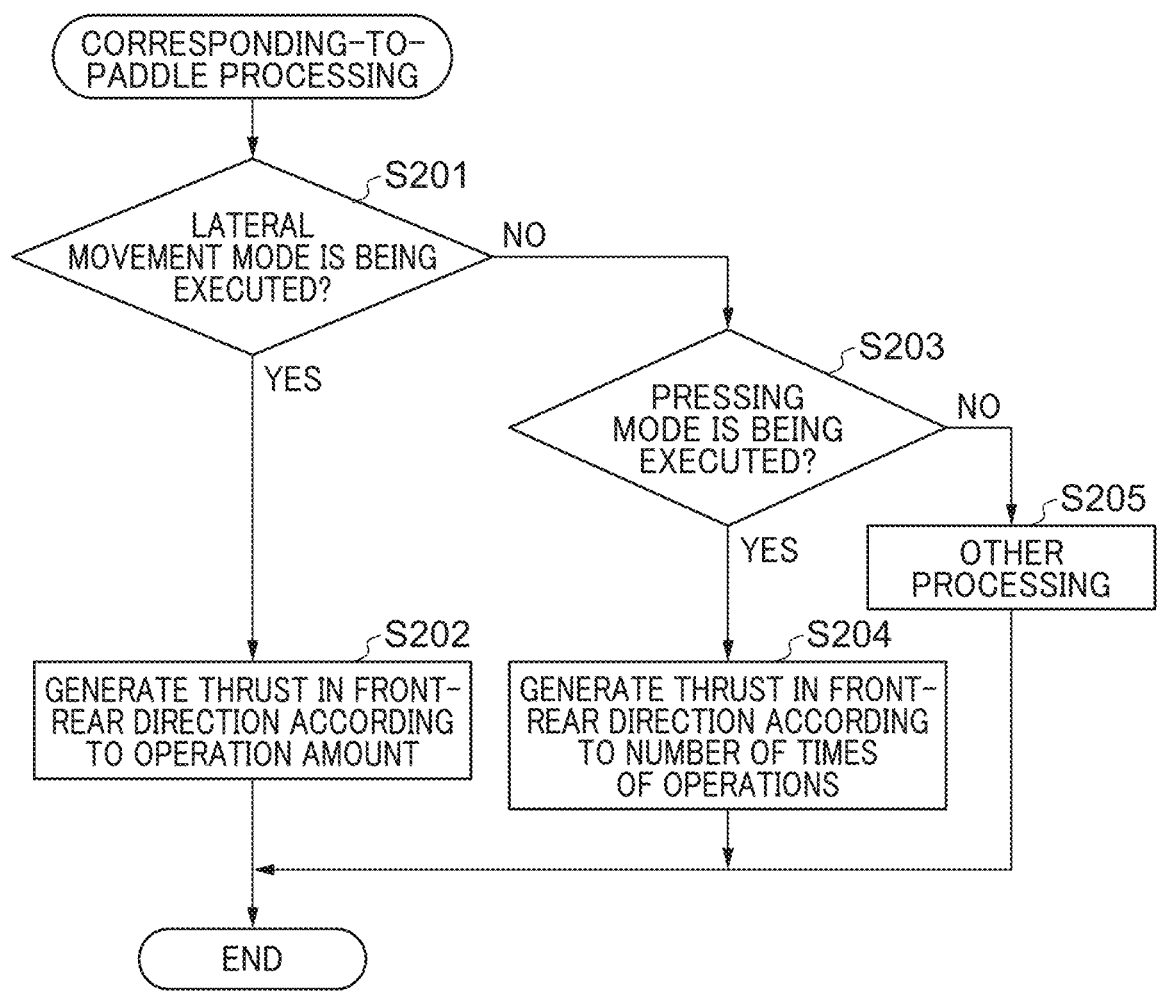
FIG. 10 is a flowchart that shows a corresponding-to-paddle process.

FIG. 10 is a flowchart that shows the corresponding-to-paddle process executed in step S114 of FIG. 8.

In step S201, the controller 40 determines whether or not the lateral movement mode is currently being executed. In the case that the lateral movement mode is being executed (YES in step S201), the controller 40 proceeds to step S202, and on the other hand, in the case that the lateral movement mode is not being executed (NO in step S201), the controller 40 proceeds to step S203.

In step S202, the controller 40 controls the magnitude of the thrust in the front-rear direction acting on the hull 2 according to the operation amounts of the paddles. That is, the controller 40 controls at least one of the marine vessel propulsion devices 4L and 4R so as to generate a thrust with a magnitude corresponding to the operation amount in a direction corresponding to the operated paddle. Specifically, when the left paddle 57 is operated, the controller 40 changes the magnitude of the thrust in the front-rear direction according to the operation amount of the left paddle 57, and when the right paddle 58 is operated, the controller 40 changes the magnitude of the thrust in the front-rear direction according to the operation amount of the right paddle 58. The controller 40 controls such that the greater the operation amount of the paddle, the greater the magnitude of the thrust in the front-rear direction.

In a preferred embodiment of the present invention, from the viewpoint of increasing the efficiency of thrust change, the controller 40 changes only the thrust of the marine vessel propulsion device providing a forward moving component thrust. During the right lateral movement mode or during the right pressing mode, the marine vessel propulsion device 4L corresponds to the marine vessel propulsion device providing the forward moving component thrust. During the left lateral movement mode or during the left pressing mode, the marine vessel propulsion device 4R corresponds to the marine vessel propulsion device providing the forward moving component thrust. It should be noted that the thrust of both the marine vessel propulsion devices 4L and 4R may be changed, or only the thrust of the marine vessel propulsion device providing a backward moving component thrust may be changed.

An example will be described. For example, it is assumed that the right paddle 58 is newly operated during the right lateral movement mode shown in FIG. 9A. Upon this, the forward thrust corresponding to the operation amount (the operation depth) of the right paddle 58 after the operation is generated. For this purpose, the controller 40 at least either increases the thrust of the marine vessel propulsion device 4L or decreases the thrust of the marine vessel propulsion device 4R. Here, from the viewpoint of improving the efficiency of the thrust change, the controller 40 increases only the thrust of the marine vessel propulsion device 4L providing the forward moving component thrust.

By changing (increasing) only the thrust of the marine vessel propulsion device 4L, a state shown in FIG. 9B is obtained. It should be noted that the angles of the first thrust acting line 4L-P and the second thrust acting line 4R-P are not changed. FIG. 9B shows the thrust acting on the hull 2 when only the first thrust FL is increased without changing the second thrust FR with respect to the state of FIG. 9A. By increasing only the thrust of the marine vessel propulsion device 4L, the vector direction of the resultant force FS faces to diagonal front right while the acting point FO coincides with the center of gravity G. As a result, the hull 2 moves laterally to the diagonal front right.

On the other hand, it is assumed that the left paddle 57 is newly operated during the right lateral movement mode shown in FIG. 9A. In this case, the controller 40 decreases only the thrust of the marine vessel propulsion device 4L. Upon this, a state shown in FIG. 9C is obtained. By decreasing only the first thrust FL without changing the second thrust FR, the vector of the resultant force FS faces to diagonal rear right while the acting point FO coincides with the center of gravity G. As a result, the hull 2 moves laterally to the diagonal rear right.

On the other hand, the control of the thrust in the front-rear direction performed by the paddle operation during the left lateral movement mode can be considered left and right symmetrical with respect to the case during the right lateral movement mode.

For example, when the right paddle 58 is newly operated during the left lateral movement mode, the controller 40 increases only the thrust of the marine vessel propulsion device 4R providing the forward moving component thrust. Upon this, a state shown in FIG. 9D is obtained. The vector direction of the resultant force FS faces to diagonal front left, and the hull 2 moves laterally to the diagonal front left. On the other hand, when the left paddle 57 is newly operated during the left lateral movement mode, the controller 40 decreases only the thrust of the marine vessel propulsion device 4R. Upon this, a state shown in FIG. 9E is obtained. The vector of the resultant force FS faces to diagonal rear left, and the hull 2 moves laterally to the diagonal rear left.

In addition, in the case that the operation of the paddle is an operation that increases the operation amount from a position halfway in the operation direction, the controller 40 controls so as to increase the thrust in the front-rear direction, which has been generated, in accordance with the operation amount.

On the other hand, in the case that the operation of the paddle is an operation that decreases the operation amount, the controller 40 controls so as to decrease the thrust in the front-rear direction, which has been generated, in accordance with the current operation amount. For example, in the case that the operation amount of the right paddle 58 decreases during the right lateral movement mode and during lateral moving to the diagonal front right, the controller 40 decreases the thrust of the marine vessel propulsion device 4L. As a result, the vector direction of the resultant force FS becomes closer to the right. In addition, in the case that the operation amount of the left paddle 57 decreases during the right lateral movement mode and during lateral moving to the diagonal rear right, the controller 40 increases the thrust of the marine vessel propulsion device 4L. As a result, the vector direction of the resultant force FS becomes closer to the right.

In addition, in the case that the operation amount of the right paddle 58 decreases during the left lateral movement mode and during lateral moving to the diagonal front left, the controller 40 decreases the thrust of the marine vessel propulsion device 4R. As a result, the vector direction of the resultant force FS becomes closer to the left. In addition, in the case that the operation amount of the left paddle 57 decreases during the left lateral movement mode and during lateral moving to the diagonal rear left, the controller 40 increases the thrust of the marine vessel propulsion device 4R. As a result, the vector direction of the resultant force FS becomes closer to the left.

The marine vessel operator is operating either the switch 53 or the switch 54 during the lateral movement mode. In this state, it is necessary to operate either the paddle 57 or the paddle 58. However, the switch 53 is positioned within the angle range $\theta L$, and the switch 54 is positioned within the angle range $\theta R$ (see FIG. 6). Therefore, since the marine vessel operator is able to easily operate the paddles 57 and 58 while pressing the lateral movement switches 53 and 54, the operability is easy.

In step S203, the controller 40 determines whether or not the pressing mode is currently being executed. In the case that the pressing mode is being executed (YES in step S203), the controller 40 proceeds to step S204, and on the other hand, in the case that the pressing mode is not being executed (NO in step S203), the controller 40 proceeds to step S205.

In step S204, the controller 40 controls the magnitude of the thrust in the front-rear direction acting on the hull 2 according to the number of times of operations of the paddles. That is, the controller 40 controls at least one of the marine vessel propulsion devices 4L and 4R so as to generate a thrust with a magnitude corresponding to the number of times of the operations in the direction (forward or backward) corresponding to the operated paddle. It should be noted that there is no distinction between the left pressing mode and the right pressing mode as far as the control of the thrust change in the front-rear direction is concerned.

The controller 40 performs a control so as to change the magnitude of the thrust in the front-rear direction in stages (one stage at a time) each time the number of times of the operations of the paddles increases. Specifically, as the thrust stage of the thrust in the front-rear direction, a plurality of stages is predetermined. It is assumed that a + direction is the forward moving direction and a – direction is the backward moving direction. The controller 40 displaces the thrust stage by 1 stage in the backward moving direction (by –1 stage in the forward moving direction) each time the left paddle 57 is operated, and displaces the thrust stage by 1 stage in the forward moving direction (by +1 stage in the forward moving direction) each time the right paddle 58 is operated.

From the viewpoint of improving the efficiency of the thrust change, the controller 40 changes only the thrust of the marine vessel propulsion device providing the forward moving component thrust in stages. It should be noted that the thrust of both the marine vessel propulsion devices 4L and 4R may be changed in stages, or only the thrust of the marine vessel propulsion device providing the backward moving component thrust may be changed in stages. The control of the marine vessel propulsion devices 4L and 4R for changing the thrust in the front-rear direction is the same as the control in the lateral movement mode (step S202).

It is assumed that in FIG. 9A, it is during the right pressing mode, and the hull 2 is in a alongside pier state (the hull 2 comes alongside the pier). When the right paddle 58 is operated once in this state, since the thrust in the forward moving direction is increased by one stage, as shown in FIG. 9B, the thrust toward the diagonal front right acts on the hull 2. Since the hull 2 is already in the alongside pier state, the hull 2 moves forward. Therefore, it is convenient to finely adjust the position in the front-rear direction of the hull 2, which is in the alongside pier state. It should be noted that in the case that it is during the pressing mode and the hull 2 is not in the alongside pier state, each time the right paddle 58 is operated once, the direction of diagonal movement (diagonally moving) becomes closer to the front.

In step S205, the controller 40 executes other processes corresponding to the paddle operation. After steps S202, S204, and S205, the controller 40 ends the corresponding-to-paddle process shown in FIG. 10.

In this way, the controller 40 performs the control so as to generate or change the thrust in the front-rear direction acting on the hull 2 according to the paddle operation when the lateral thrust generation mode is being executed. That is, when the right paddle 58 is operated, the controller 40 generates the forward thrust, increases the forward thrust, or decreases the backward thrust. When the left paddle 57 is operated, the controller 40 generates the backward thrust, increases the backward thrust, or decreases the forward thrust. Therefore, it is possible to adjust the direction of the diagonal movement and adjust the position in the front-rear direction.

In addition, in the lateral movement mode or in the pressing mode, in order to laterally move or diagonally move the hull 2 without causing pivot-turning, the extension line of the vector of the resultant force FS should pass through the center of gravity G. The acting point FO and the center of gravity G do not necessarily have to coincide with each other.

According to a preferred embodiment of the present invention, the left lateral movement switch 53 and the left pressing switch 63 are different from each other in height in the pressing direction (in the position of the operated surface) (see FIG. 7). In addition, the right lateral movement switch 54 and the right pressing switch 64 are different from each other in height in the pressing direction. Here, the switches 53 and 54 and the switches 63 and 64 have a common function that starts the lateral moving of the hull 2, and are adjacent to each other.

Therefore, according to a preferred embodiment of the present invention, it may not be easy to operate appropriate switches unless the marine vessel operator operates the switches while carefully and visually confirming the switches. Moreover, since the functions of the switches 53 and 54 and the switches 63 and 64 partially overlap, they are likely to be recognized as conceptually similar switches. Therefore, by providing different heights as described above, the switches are easily recognized even by the feeling of touch, and the appropriate switches are operated without sufficient visual check. Therefore, it is possible to improve the operability of the switches (the switches 53, 54, 63, and 64).

In addition, since the switches 53 and 54 are located at the positions where the marine vessel operator is able to operate the switches 53 and 54 with the fingers of the hands operating the paddles 57 and 58, respectively, it is possible to improve the operability including the operation of the paddles 57 and 58.

In particular, as shown in FIG. 6, the switches 53 and 63 are positioned within the angle range θL in the circumferential direction about the rotation fulcrum C0 in which the left paddle 57 is located, and the switches 54 and 64 are positioned within the angle range θR in the circumferential direction in which the right paddle 58 is located. In addition, when viewed from the shaft line direction of the rotation fulcrum C0, at least a portion of the first spoke portion 45 and at least a portion of the left paddle 57 overlap each other, and at least a portion of the second spoke portion 46 and at least a portion of the right paddle 58 overlap each other. These facilitate concurrent operations of the switches 54 and 64 and the left paddle 57 and concurrent operations of the switches 53 and 54 and the right paddle 58.

Moreover, the switches 53 and 54 that continue to generate the thrust in the lateral direction with respect to the hull 2 while they are pressed by the marine vessel operator, and the switches 63 and 64 that generate the thrust in the lateral direction with respect to the hull 2 in response to being pressed, are provided separately. As a result, it is possible to improve the operability especially when making the hull 2 move laterally or bringing the hull 12 alongside the pier.

Further, the lateral thrust acting on the hull 2 is smaller in thrust in the lateral direction while the switches 53 and 54 are pressed by the marine vessel operator (in the lateral movement mode) than the thrust in the lateral direction generated in response to pressing of the switches 63 and 64 (in the pressing mode). As a result, it is possible to appropriately execute wanting to bring the hull 12 alongside the pier quickly and the case of wanting to maintain the alongside pier state.

In addition, the switches 53 and 63 are positioned above the virtual plane 50, and in the circumferential direction about the rotation fulcrum C0, are positioned within the angle range from about 20° to about 40° with respect to the virtual plane 50 (see FIG. 6). This makes it easy for the marine vessel operator to operate the switches 53 and 63 while standing. It should be noted that from the viewpoint of facilitating the operation, the switches 53 and 63 may be positioned within an angle range from, for example, about 0° to about 60° with respect to the virtual plane 50.

In addition, the switches 53 and 63 are positioned on the common virtual straight line L1, and the switches 54 and 64 are positioned on the common virtual straight line L2 (see FIG. 6). As a result, the switches having similar functions in terms of the lateral movement in the same direction are located side by side, so that the operation is intuitively understood.

In addition, in the radial direction centered on the rotation fulcrum C0, the outer edge positions of the switches 53 and 54 are farther away than the outer edge positions of the switches 63 and 64 with respect to the rotation fulcrum C0. This makes it easy to operate the switches 53 and 54 with thumbs of the hands that grips the wheel portion 43. When bringing the hull 12 alongside the pier, it is assumed that the pressing operation and the releasing operation of the switches 53 and 54 are repeated several times. Therefore, locating the switches 53 and 54, which are frequently used during the alongside pier operation, closer to the wheel portion 43 contributes to an improvement in the operability.

Further, since the operated surface 53a of the left lateral movement switch 53 becomes higher toward the outer side in the radial direction centered on the rotation fulcrum C0, it is easy to recognize the operated surface 53a with the sense of touch, which contributes to an improvement in the operability.

In addition, by operating the enabled/disabled changeover switch 59 to switch the marine vessel maneuvering mode between the normal marine vessel maneuvering mode and the drive mode, the functions of the switches 53, 54, 63, and 64 are easily switched between enabled and disabled. As a result, the usability is improved.

Furthermore, since the set of the switches 53 and 63 is located on the first spoke portion 45 that extends to the upper left from the central portion 44, and the set of the switches 54 and 64 is located on the second spoke portion 46 that extends to the upper right from the central portion 44, it is possible to improve the operability with the left and right hands in the left and right lateral thrust generation modes.

According to a preferred embodiment of the present invention, the mode switches that issue an instruction to execute the lateral thrust generation modes (the switches 53, 54, 63, and 64) are provided on the wheel portion 43, and the steering apparatus 14 is further provided with the left paddle 57 and the right paddle 58 that are used to issue an instruction to apply a thrust in the front-rear direction to the hull 2. The controller 40 is configured or programmed to control at least one of the marine vessel propulsion devices 4L and 4R, and execute the lateral thrust generation modes in accordance with the instructions from the mode switches. The controller 40 is configured or programmed to control at least one of the marine vessel propulsion devices 4L and 4R to generate or change the thrust in the front-rear direction acting on the hull 2 in response to the operations of the paddles 57 and 58 when the lateral thrust generation mode is being executed. For example, with the operations near the wheel portion 43, the marine vessel operator is able to move the hull 2 diagonally during the lateral movement mode, and adjust the longitudinal position of the hull 2 during the pressing mode. As a result, it is possible to improve the operability when bringing the hull 12 alongside the pier.

In addition, when the lateral thrust generation mode is being executed, by changing only the thrust of the marine vessel propulsion device providing the forward moving component thrust in accordance with the paddle operations, it is possible to increase the efficiency of the thrust change in the front-rear direction.

In addition, in the case that the paddle operation is performed when the lateral movement mode is being executed, the magnitude of the thrust in the front-rear direction acting on the hull 2 is controlled in response to the operation amounts of the paddles. This allows the marine vessel operator to adjust, for example, a forward moving speed or a backward moving speed (that is, a diagonal movement speed) during the lateral movement. In particular, since the control is performed so that the greater the operation amount of the paddle, the greater the magnitude of the thrust in the front-rear direction, it matches the operator's feeling, and the operability is easy.

In addition, in the case that the paddle operation is performed when the pressing mode is being executed, the magnitude of the thrust in the front-rear direction acting on the hull 2 is controlled in response to the number of times of the operations of the paddles. As a result, for example, it is possible to easily maintain the pressed state of the hull 2 at an appropriate longitudinal position. In particular, since the magnitude of the thrust in the front-rear direction changes in stages each time the number of times of the operations of the paddles increases, it is easy to perform a fine adjustment, and the operability is easy.

Further, since the lateral movement mode during the operation period of the switches 53 and 54 is maintained, the lateral movement of the hull 2 is continued by continuing to press the switches. This facilitates the switching operation between execution and interruption of the lateral movement mode. On the other hand, during the period from when the switches 63 and 64 are operated until when the release operation is performed, the pressing mode is maintained. For example, when the left pressing switch 63 is press-operated during the left pressing mode, the left pressing mode is released, and when the right pressing switch 64 is press-operated during the right pressing mode, the right pressing mode is released. Therefore, it is possible to remove the fingers from the switches 63 and 64 while maintaining the execution of the pressing mode. This contributes to an improvement in the operability.

In addition, the set of the switches 53 and 63 and the set of the switches 54 and 64 are provided as a left and right pair. In the lateral thrust generation mode, since the thrust is generated in the left direction with the left pair of switches or the right direction with the right pair of switches, it is possible to bring the hull 12 alongside the pier on either the left side or the right side.

It should be noted that as long as it is possible to obtain the effect of enhancing the operability when bringing the hull 12 alongside the pier by moving the hull 2 diagonally during the lateral movement mode and by adjusting the longitudinal position of the hull 2 during the pressing mode, it does not matter where the switches 53, 63, 54, and 64 and the paddles 57 and 58 are located. In addition, the positional relationships between the switches 53, 63, 54, and 64, and the paddles 57 and 58 also do not matter.

Although the present invention has been described in detail based on the preferred embodiments described above, the present invention is not limited to these specific preferred embodiments, and various embodiments within the scope not deviating from the gist of the present invention are also included in the present invention. For example, the following modifications are possible.

For example, a portion or all of the functions of the switches and the paddles of the steering apparatus 14 may be enabled in both the normal marine vessel maneuvering mode and the drive mode.

It should be noted that the hull 2 may be provided with three or more marine vessel propulsion devices, and the controller 40 may control the three or more marine vessel propulsion devices to realize control of the lateral movement, the diagonal movement, and the pivot turning. It should be noted that some or all of the marine vessel propulsion devices may be electric motors.

It should be noted that providing the enabled/disabled changeover switch 59 is not essential, and the lateral thrust generation mode and the pivot turning mode may be realized within the normal marine vessel maneuvering mode. In that case, at least a portion of the switches 53, 54, 55, 56, 59, 63, and 64, and the paddles 57 and 58 are always enabled, and steps S101, S115, and S116 of FIG. 8 may be eliminated. Regarding release of the lateral thrust generation mode or the pivot turning mode in the case that the enabled/disabled changeover switch 59 is not provided, it may be released by operating a component of the marine vessel 1 with a higher functional priority such as the remote control unit 15. Alternatively, a predetermined button may be assigned for release for each mode.

It should be noted that the set of the switches 53 and 63 and the set of the switches 54 and 64 do not necessarily have to be provided as the left and right pair, and may be provided only on one side.

It should be noted that the paddles 57 and 58 may be provided on the wheel portion 43. It should be noted that a configuration, in which the paddles 57 and 58 do not rotate integrally with the wheel portion 43, is not excluded.

It should be noted that the wheel portion 43, which is rotate-operated for steering, does not have to be annular, and it is also not essential that the wheel portion 43 is referred to as "a wheel portion".

It should be noted that a single switch may be provided with a function to select or activate "the lateral movement mode" and a function to select or activate "the pressing mode". For example, at least one of the switches 53, 54, 63, and 64 may be provided with a function that is able to select or activate the lateral movement mode or the pressing mode depending on the operation mode. One example of such a function is that the lateral movement mode may be selected or activated when the switch 53 or the switch 54 is operated for a short time, and the pressing mode may be selected or activated when the switch 53 or the switch 54 is operated for a long time exceeding a certain period of time (when a long press of the switch 53 or the switch 54 is performed).

It should be noted that at least one of the switches 53, 54, 55, 56, 59, 63, and 64 is not limited to a push button type switch, and may be one of other types of switches, for example, may be a slide type switch, a rotary type switch, or a toggle type switch.

Figure 11:
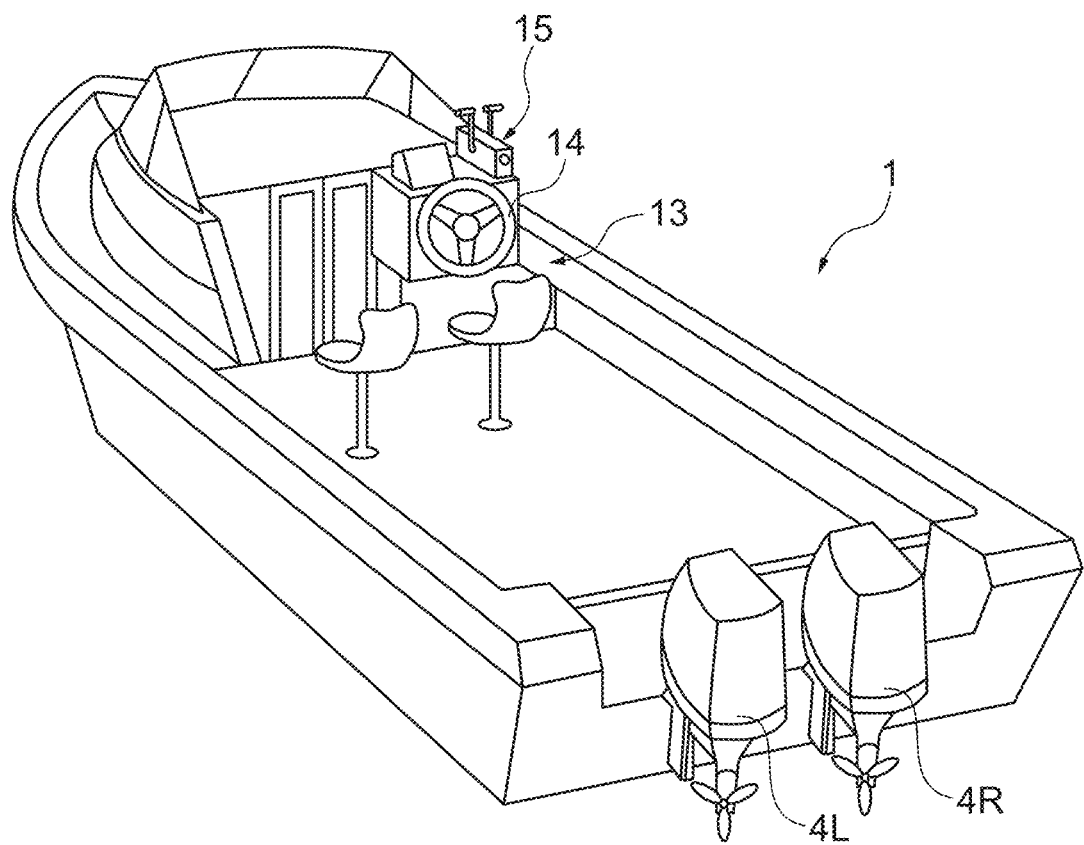
FIG. 11 is a perspective view of another marine vessel.

A marine vessel, to which preferred embodiments of the present invention are applied, is not limited to a jet propulsion boat, and may be one of other types of marine vessels. For example, as shown in FIG. 11, the marine vessel may include outboard motors functioning as the marine vessel propulsion devices 4L and 4R. That is, the marine vessel propulsion devices 4L and 4R are not limited to jet propulsion devices, and may be other marine vessel propulsion devices such as outboard motors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine vessel maneuvering support system comprising:
   a steering apparatus including a wheel portion supported rotatably with respect to a hull;
   mode switches provided on the wheel portion and operable to execute lateral thrust generation modes to generate a thrust that moves the hull in a lateral direction;
   paddles provided on the steering apparatus and operable to cause a thrust to be applied to the hull in a front-rear direction; and
   a controller configured or programmed to control at least two propulsion devices and execute the lateral thrust generation modes in accordance with instructions from the mode switches; wherein
   the controller is configured or programmed to control at least one propulsion device of the at least two propulsion devices to generate or change the thrust in the front-rear direction acting on the hull and thereby move the hull in the front-rear direction in response to operations of the paddles when the lateral thrust generation mode is being executed.

2. The marine vessel maneuvering support system according to claim 1, wherein, in a case of changing only a thrust of one propulsion device of the at least two propulsion devices when the lateral thrust generation mode is being executed, the controller is configured or programmed to change a thrust of the propulsion device providing a forward moving component thrust.

3. The marine vessel maneuvering support system according to claim 1, wherein
   the lateral thrust generation modes include first modes and second modes;
   the thrust that moves the hull in the lateral direction is smaller in the second mode than in the first mode; and
   execution of the first mode or execution of the second mode is activated by operations of the mode switches.

4. The marine vessel maneuvering support system according to claim 3, wherein the mode switches include first switches to cause execution of the first mode and second switches to cause execution of the second mode.

5. The marine vessel maneuvering support system according to claim 3, wherein, when the paddles are operated during the execution of the first mode, the controller is configured or programmed to control a magnitude of the thrust in the front-rear direction acting on the hull according to an operation amount of the paddles.

6. The marine vessel maneuvering support system according to claim 5, wherein the controller is configured or programmed to perform a control so that, during the execution of the first mode, the magnitude of the thrust in the front-rear direction increases as the operation amount of the paddles increases.

7. The marine vessel maneuvering support system according to claim 3, wherein, when the paddle is operated during the execution of the second mode, the controller is configured or programmed to control a magnitude of the thrust in the front-rear direction acting on the hull according to a number of times the paddles are operated.

8. The marine vessel maneuvering support system according to claim 7, wherein the controller is configured or programmed to perform a control so that, during the execution of the second mode, the magnitude of the thrust in the front-rear direction is changed in stages each time the paddles are operated.

9. The marine vessel maneuvering support system according to claim 4, wherein the controller is configured or programmed to maintain the first mode during an operation period of the first switches.

10. The marine vessel maneuvering support system according to claim 4, wherein the controller is configured or programmed to maintain the second mode during a period from when the second switches are operated until when a release operation is performed.

11. The marine vessel maneuvering support system according to claim 1, wherein
   the mode switches are provided as a left pair and a right pair; and
   in the lateral thrust generation mode, the controller is configured or programmed to generate a thrust in a left direction with the left pair of switches or a right direction with the right pair of switches.

12. The marine vessel maneuvering support system according to claim 1, wherein
   the paddles include a paddle to move the hull forward and a paddle to move the hull backward;
   when the paddle for forward movement is operated during execution of the lateral thrust generation mode, the controller is configured or programmed to generate a forward thrust, increase the forward thrust, or decrease a backward thrust; and
   when the paddle for backward movement is operated during the execution of the lateral thrust generation mode, the controller is configured or programmed to generate the backward thrust, increase the backward thrust, or decrease the forward thrust.

13. A marine vessel maneuvering support system comprising:
   a steering apparatus including a wheel portion supported rotatably with respect to a hull;

mode switches operable to execute lateral thrust generation modes to generate a thrust that moves the hull in a lateral direction;

paddles operable to cause a thrust to be applied to the hull in a front-rear direction; and a controller configured or programmed to control at least two propulsion devices and execute the lateral thrust generation modes in accordance with instructions from the mode switches; wherein the controller is configured or programmed to control at least one propulsion device of the at least two propulsion devices to generate or change the thrust in the front-rear direction acting on the hull and thereby move the hull in the front-rear direction in response to operations of the paddles when the lateral thrust generation mode is being executed.

14. A marine vessel comprising:

the marine vessel maneuvering support system according to claim 1.

15. The marine vessel according to claim 14, further comprising:

the at least two propulsion devices.

* * * * *

UNITED STATES PATENT AND TRADEMARK OFFICE
CERTIFICATE OF CORRECTION

| | |
|---|---|
| PATENT NO. | : 12,325,503 B2 |
| APPLICATION NO. | : 17/976977 |
| DATED | : June 10, 2025 |
| INVENTOR(S) | : Takuya Murayama et al. |

It is certified that error appears in the above-identified patent and that said Letters Patent is hereby corrected as shown below:

On the Title Page

Item [73], change "TAMAHA HATSUDOKI KABUSHIKI KAISHA, Shizuoka (JP)" to --YAMAHA HATSUDOKI KABUSHIKI KAISHA, Shizuoka (JP)--

Signed and Sealed this
Fifth Day of August, 2025

Coke Morgan Stewart
*Acting Director of the United States Patent and Trademark Office*